United States Patent
Sasada et al.

(10) Patent No.: US 8,757,786 B2
(45) Date of Patent: Jun. 24, 2014

(54) INK SET AND IMAGE FORMING METHOD

(75) Inventors: Misato Sasada, Kanagawa (JP); Yasufumi Ooishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 290 days.

(21) Appl. No.: 13/359,500

(22) Filed: Jan. 27, 2012

(65) Prior Publication Data

US 2012/0200651 A1    Aug. 9, 2012

(30) Foreign Application Priority Data

Feb. 7, 2011  (JP) ................ 2011-024479

(51) Int. Cl.
*B41J 2/01*   (2006.01)
*B41J 2/21*   (2006.01)
*B41J 11/00*  (2006.01)

(52) U.S. Cl.
CPC *B41J 2/01* (2013.01); *B41J 2/2114* (2013.01); *B41J 2/2107* (2013.01); *B41J 11/002* (2013.01)
USPC ............... 347/100; 347/95; 347/96; 347/102

(58) Field of Classification Search
CPC ........... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC .......... 347/100, 95, 96, 101, 102, 88, 21, 99, 347/20, 9; 106/31.6, 31.27, 31.13; 523/160, 523/161

See application file for complete search history.

(56) References Cited

U.S. PATENT DOCUMENTS 6,767,090 B2 *  7/2004  Yatake et al. ............. 347/100
2007/0293601 A1 * 12/2007  Ushiku et al. ............ 523/160

(Continued)

FOREIGN PATENT DOCUMENTS

| JP | 2001-115067 |   | 4/2001 |
|----|-------------|---|--------|
| JP | 2002-332433 | A | 11/2002 |
| JP | 2003-160751 | A | 6/2003 |
| JP | 2007-161850 | A | 6/2007 |
| JP | 2008-239705 |   | 10/2008 |

(Continued)

OTHER PUBLICATIONS

English language translation of the following: Office action dated May 28, 2013 from the JPO in a Japanese patent application corresponding to the instant patent application. This office action translation is submitted now in order to supplement the understanding of patent document JP2001-115067 and JP2008-239705 which are cited in the office action and are being disclosed in the instant Information Disclosure Statement.

*Primary Examiner* — Manish S Shah
(74) *Attorney, Agent, or Firm* — SOLARIS Intellectual Property Group, PLLC

(57) ABSTRACT

An ink set is disclosed which includes a yellow ink composition containing a resin-coated yellow pigment in which a yellow pigment is coated with a crosslinked water-soluble resin, a water-soluble polymerizable compound and water; a magenta ink composition containing a resin-coated magenta pigment in which a magenta pigment is coated with a crosslinked water-soluble resin, a water-soluble polymerizable compound and water; a cyan ink composition containing a resin-coated cyan pigment in which a cyan pigment is coated with a crosslinked water-soluble resin, a water-soluble polymerizable compound and water; and a treatment liquid containing an aggregating agent for aggregating components in the ink compositions.

12 Claims, 1 Drawing Sheet

(56) References Cited

U.S. PATENT DOCUMENTS

2008/0254265 A1* 10/2008 Ito et al. .................... 428/195.1
2009/0085996 A1* 4/2009 Kasai .......................... 347/100

FOREIGN PATENT DOCUMENTS

| JP | 2009-149805 A | 7/2009 |
| WO | 2010-038071 | 4/2010 |

* cited by examiner

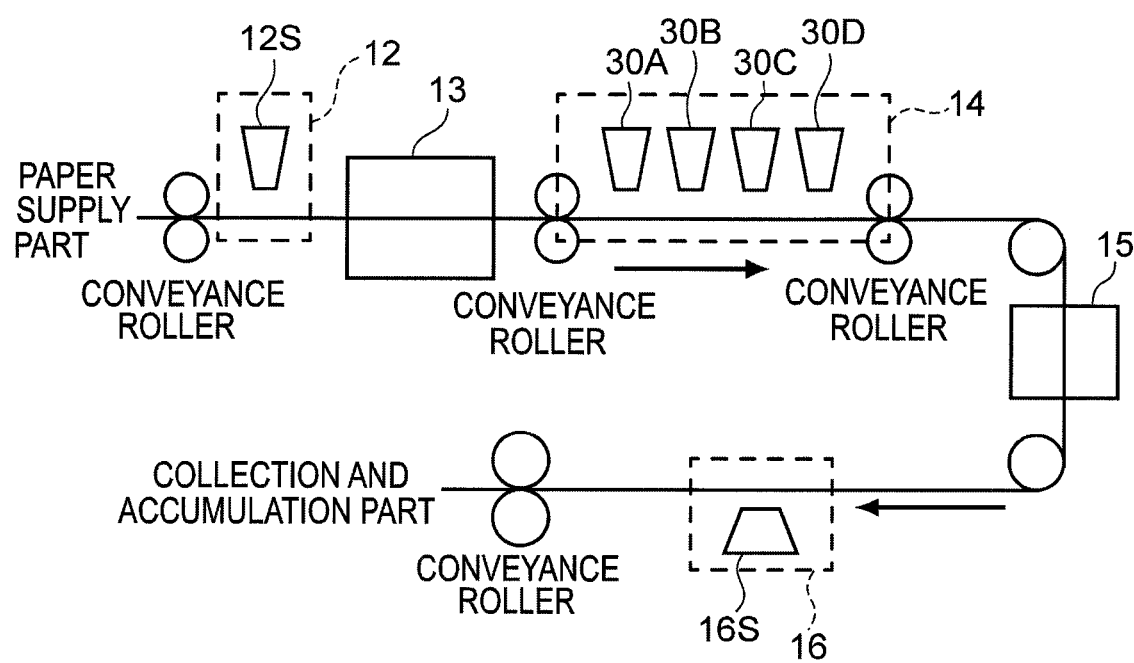

INK SET AND IMAGE FORMING METHOD

CROSS-REFERENCE TO RELATED APPLICATION

This application is based on and claims priority under 35 USC 119 from Japanese Patent Application No. 2011-024479 filed on Feb. 7, 2011, the disclosure of which is incorporated herein by reference.

BACKGROUND OF THE INVENTION

1. Technical Field

The present invention relates to an ink set and an image forming method.

2. Related Art

Inkjet technology has been used as an image recording method for recording a color image in the fields of office printers, home printers and the like.

In inkjet technology, an ink set having a combination of an ink containing a coloring material and additional liquid(s) may be used. As an example thereof, an ink set is known in which an anionic or cationic ink containing a coloring material is combined with a liquid composition which contains dispersed particles the surface of which is charged with polarity opposite to that of the ink and also contains a polymerizable component capable of being cured into a polymer when energy is applied to the component and a solvent capable of dissolving the polymerizable component (for example, see Japanese Patent Application Laid-Open (JP-A) No. 2002-332433).

Further, as an ink set used in inkjet technology, an ink set is also known in which inks of two or more colors are combined (for example, see JP-A Nos. 2003-160751, 2007-161850 and 2009-149805).

SUMMARY OF THE INVENTION

However, with regard to the ink composition disclosed in each of JP-A Nos. 2002-332433, 2003-160751, 2007-161850 and 2009-149805, it has been found that an image forming property and rubbing-off resistance of an image may not be sufficient, or color reproducibility of a red, blue or green image may not be sufficient when the red, green or blue image is formed by superposing any two colors selected from a yellow ink composition, a magenta ink composition and a cyan ink composition.

The present invention has been made in view of the aforementioned problems, and an object of the present invention is to provide an ink set and an image forming method, which are excellent in terms of an image forming property and rubbing-off resistance of an image and are also excellent in terms of color reproducibility of a red, blue or green image.

According to the first aspect of the present invention an ink set is disclosed which includes: a yellow ink composition containing a resin-coated yellow pigment in which a yellow pigment is coated with a crosslinked water-soluble resin, a water-soluble polymerizable compound and water; a magenta ink composition containing a resin-coated magenta pigment in which a magenta pigment is coated with a crosslinked water-soluble resin, a water-soluble polymerizable compound and water; a cyan ink composition containing a resin-coated cyan pigment in which a cyan pigment is coated with a crosslinked water-soluble resin, a water-soluble polymerizable compound and water; and a treatment liquid containing an aggregating agent for aggregating components in the ink compositions, wherein, when a red, green or blue image is formed by superposing any two ink compositions selected from the group consisting of the yellow ink composition, the magenta ink composition and the cyan ink composition, the yellow ink composition, the magenta ink composition or the cyan ink composition jetted first among the two ink compositions satisfies one of the following requirements (1) to (3):

(1) when the ink composition jetted first among the two ink compositions is the magenta ink composition, the magenta ink composition has a content of the magenta pigment of from 4.2 to 6.0% by mass based on the total amount of the magenta ink composition, and a mass ratio of the crosslinked water-soluble resin to the magenta pigment (mass of crosslinked water-soluble resin/mass of magenta pigment) is 0.25 or more;

(2) when the ink composition jetted first among the two ink compositions is the cyan ink composition, the cyan ink composition has a content of the cyan pigment of from 2.0 to 4.0% by mass based on the total amount of the cyan ink composition, and a mass ratio of the crosslinked water-soluble resin to the cyan pigment (mass of crosslinked water-soluble resin/mass of cyan pigment) is 0.40 or more; or (3) when the ink composition jetted first among the two ink compositions is the yellow ink composition, the yellow ink composition has a content of the yellow pigment of from 3.0 to 6.0% by mass based on the total amount of the yellow ink composition, and a mass ratio of the crosslinked water-soluble resin to the yellow pigment (mass of crosslinked water-soluble resin/mass of yellow pigment) is 0.40 or more.

According to a second aspect of the present invention, an image forming method using the ink set of the first aspect is disclosed, which the method includes:

applying the treatment liquid containing the aggregating agent for aggregating components in the ink compositions onto a recording medium, applying a first ink composition selected from the ink set onto the recording medium onto which the treatment liquid has been applied, by an inkjet method, applying a second ink composition selected from the ink set onto the first ink composition that has been applied onto the recording medium, by an inkjet method, and curing the ink compositions by irradiating active energy radiation on the recording medium onto which the ink compositions have been applied.

The present invention is capable of providing an ink set and an image forming method, which exhibit an excellent image forming property and rubbing-off resistance of an image and also have excellent color reproducibility of a red, blue or green image.

BRIEF DESCRIPTION OF THE DRAWINGS

FIG. 1 is a schematic diagram showing an example of an inkjet recording apparatus used in an image forming method in accordance with the present invention.

DETAILED DESCRIPTION OF THE INVENTION

<Ink Set>

The ink set in accordance with the present invention includes a yellow ink composition containing a resin-coated yellow pigment in which a yellow pigment is coated with a crosslinked water-soluble resin, a water-soluble polymerizable compound and water, a magenta ink composition containing a resin-coated magenta pigment in which a magenta pigment is coated with a crosslinked water-soluble resin, a water-soluble polymerizable compound and water, a cyan ink composition containing a resin-coated cyan pigment in which a cyan pigment is coated with a crosslinked water-soluble resin, a water-soluble polymerizable compound and water, and a treatment liquid containing an aggregating agent for aggregating components in the ink compositions, wherein, when a red, green or blue image is formed by superposing any two ink compositions selected from the group consisting of the yellow ink composition, the magenta ink composition and the cyan ink composition, the yellow ink composition, the magenta ink composition or the cyan ink composition jetted first among the two ink compositions satisfies one of the requirements (1) to (3) given below.

(1) When the ink composition jetted first among the two ink compositions is a magenta ink composition, the magenta ink composition has a content of the magenta pigment of from 4.2 to 6.0% by mass based on the total amount of the magenta ink composition, and a mass ratio of the crosslinked water-soluble resin to the magenta pigment (mass of crosslinked water-soluble resin/mass of magenta pigment) is 0.25 or more.

(2) When the ink composition jetted first among the two ink compositions is a cyan ink composition, the cyan ink composition has a content of the cyan pigment of from 2.0 to 4.0% by mass based on the total amount of the cyan ink composition, and a mass ratio of the crosslinked water-soluble resin to the cyan pigment (mass of crosslinked water-soluble resin/mass of cyan pigment) is 0.40 or more.

(3) When the ink composition jetted first among the two ink compositions is a yellow ink composition, the yellow ink composition has a content of the yellow pigment of from 3.0 to 6.0% by mass based on the total amount of the yellow ink composition, and a mass ratio of the crosslinked water-soluble resin to the yellow pigment (mass of crosslinked water-soluble resin/mass of yellow pigment) is 0.40 or more.

As a result of studies conducted by the present inventors, it was found that when using a conventional ink set, in some cases, an image forming property or rubbing-off resistance of an image may decrease, and color reproducibility of a red, blue or green image may also decrease when the red, green or blue image is formed by superposing any two colors selected from the group consisting of a yellow ink composition, a magenta ink composition and a cyan ink composition. These tendencies are pronounced particularly when image recording is carried out at a higher speed than in a conventional method. The reason for this may be thought as follows. That is, in a case where a treatment liquid containing an aggregating agent for aggregating components of an ink composition, an ink composition that is jetted first, and an ink composition that is jetted in the second place, are applied in this order onto a recording medium, and where the treatment liquid-induced aggregation of the first ink composition that is jetted first is insufficient, the ink composition jetted in the second place is mixed with the ink composition jetted first, which will result in damage to color forming of the second color.

According to an ink set of the present invention, color reproducibility of a red, blue or green image can be improved without impairing an image forming property and rubbing-off resistance of an image, when the red, green or blue image (secondary color image) is formed by superposing any two colors selected from the group consisting of a yellow ink composition, a magenta ink composition and a cyan ink composition. These effects are remarkable particularly when image recording is carried out at a higher speed than in a conventional method.

It is thought that the improved color reproducibility can be obtained due to the following reason. That is, when the amount of a pigment and a crosslinked water-soluble resin in the ink composition that is to be jetted first, which may also be referred to as a first ink composition, is adjusted to satisfy the requirements (1), (2) or (3) above, aggregation property of the first ink composition can be increased (that is, an aggregation rate is increased).

It is thought that the effect in image forming can be obtained since the stability of the ink composition can be improved by the incorporation of a resin-coated pigment in which a pigment is coated with a crosslinked water-soluble resin.

It is thought that the effect in rubbing-off resistance of an image can be obtained since an image is formed by curing an ink composition containing a polymerizable compound through the irradiation of active energy radiation. Due to this, adhesiveness of an image can also be improved.

Specific embodiments of the ink set in accordance with the present invention may include the following three embodiments.

A first embodiment of the ink set in accordance with the present invention is an ink set including the magenta ink composition that is to be jetted first as the first ink composition, one of an yellow ink composition or a cyan ink composition that is to be jetted in the second place, which may also be referred to as a second ink composition, the other one of the yellow ink composition or the cyan ink composition, and a treatment liquid. In the first embodiment, the magenta ink composition that is to be jetted as a first ink composition satisfies the requirements of (1) above.

By satisfying the requirements (1) above, color reproducibility can be improved when a magenta ink composition is jetted as the first ink composition, and a yellow ink composition or a cyan ink composition is jetted as the second color tone on the jetted magenta ink composition to form a red or blue image.

The ink set in accordance with the first embodiment may include only one kind of the cyan ink composition or may include two or more kinds of the cyan ink composition.

The ink set in accordance with the first embodiment may include only one kind of yellow ink composition or may include two or more kinds of yellow ink compositions.

The ink set in accordance with the first embodiment may include an additional magenta ink composition, in addition to the magenta ink composition that is the first ink composition.

A second embodiment of the ink set in accordance with the present invention is an ink set including a cyan ink composition that is to be jetted as a first ink composition, one of a magenta ink composition or a yellow ink composition that is to be jetted as a second ink composition, the other one of the magenta ink composition or the yellow ink composition, and a treatment liquid. In the second embodiment, the cyan ink composition that is to be jetted as a first ink composition satisfies the requirements of (2) above.

By satisfying the requirements (2) above, color reproducibility can be improved when a cyan ink composition is jetted as the first ink composition, and a magenta ink composition or a yellow ink composition is jetted as a second color tone on the jetted cyan ink composition to form a blue or green image.

The ink set in accordance with the second embodiment may include only one kind of magenta ink composition or may include two or more kinds of magenta ink compositions.

The ink set in accordance with the second embodiment may include only one kind of yellow ink composition or may include two or more kinds of yellow ink compositions.

The ink set in accordance with the second embodiment may include an additional cyan ink composition, in addition to the cyan ink composition that is the first ink composition.

A third embodiment of the ink set in accordance with the present invention is an ink set including a yellow ink composition that is to be jetted as a first ink composition, one of a cyan ink composition or a magenta ink composition that is to be jetted as a second ink composition, the other one of the cyan ink composition or the magenta ink composition, and a treatment liquid. In the third embodiment, the yellow ink composition that is to be jetted as a first ink composition satisfies the requirements (3) above.

By satisfying the requirements (3) above, color reproducibility can be improved when a yellow ink composition is jetted as the first ink composition, and a magenta ink composition or a cyan ink composition is jetted as the second color tone on the jetted yellow ink composition to form a red or green image.

The ink set in accordance with the third embodiment may include only one kind of cyan ink composition or may include two or more kinds of cyan ink composition.

The ink set in accordance with the third embodiment may include only one kind of magenta ink composition or may include two or more kinds of magenta ink compositions.

The ink set in accordance with the third embodiment may include an additional yellow ink composition, in addition to the yellow ink composition that is the first ink composition.

The ink set in accordance with the first to third embodiments may include one or more additional ink compositions such as at least one selected from the group consisting of black ink compositions, light cyan ink compositions, light magenta ink compositions, and light yellow ink compositions, in addition to a yellow ink composition, a magenta ink composition, a cyan ink composition, and a treatment liquid. As the additional ink composition, a known ink composition may be used without particular limitation.

In particular, where the ink set in accordance with the first to third embodiments includes an additional ink composition, an ink set including at least a black ink composition as the additional ink composition (an ink set including an ink composition of four or more colors) is preferred.

Hereinafter, with regard to the ink set in accordance with the present invention, a yellow ink composition, a magenta ink composition, a cyan ink composition, and a treatment liquid are described.

Description is given below focusing on the yellow ink composition and details of the magenta ink composition and the cyan ink composition common to those of the yellow ink composition may be omitted as appropriate. Individual components or preferred ranges of the magenta ink composition and the cyan ink composition are basically the same as the individual components or preferred range of the yellow ink composition, except the kind of pigment.

<Yellow Ink Composition>

The ink set in accordance with the present invention includes at least one yellow ink composition containing a resin-coated yellow pigment in which a yellow pigment is coated with a crosslinked water-soluble resin, a water-soluble polymerizable compound and water.

Hereinafter, individual components contained in the yellow ink composition are described.

In the following description, the yellow ink composition may be referred to simply as an "ink composition".

Resin-Coated Yellow Pigment in Which Yellow Pigment Coated with Crosslinked Water-Soluble Resin The yellow ink composition contains a resin-coated yellow pigment (hereinafter, also referred to as a "specific resin-coated yellow pigment") which is obtained by a method including dispersing a yellow pigment using a water-soluble resin and then crosslinking the water-soluble resin using a crosslinking agent.

The specific resin-coated yellow pigment has a configuration in which a yellow pigment is coated by a crosslinked water-soluble resin, that is, a configuration in which a yellow pigment is coated with a water-soluble resin and in which the water-soluble resin is crosslinked. Here, the yellow pigment may be completely or partially coated. An example of a method of producing the specific resin-coated yellow pigment is described below.

—Yellow Pigment—

Examples of the yellow pigment include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180, and C.I. Pigment Yellow 185.

Among these, at least one selected from C.I. Pigment Yellow 74, C.I. Pigment Yellow 155 or C.I. Pigment Yellow 185 is preferable, and C.I. Pigment Yellow 74 is most preferable.

Further, where a yellow ink composition is a yellow ink composition as a first ink composition as described above, the content of the yellow pigment is in a range of from 3.0 to 6.0% by mass based on the total amount of the yellow ink composition. In this way, color reproducibility of a secondary color image can be improved.

Where a yellow ink composition is a yellow ink composition for applications other than for the first ink composition, the content of the yellow pigment based on the total amount of the yellow ink composition is not particularly limited, but is more preferably in a range of from 3.0 to 6.0% by mass from the viewpoint of ink stability and delineation property.

The yellow ink composition may include a known pigment other than and in addition to the yellow pigment, within the scope of not impairing the effect of the present invention.

—Water-Soluble Resin—

As the water-soluble resin for coating the yellow pigment, a water-soluble resin dispersant for dispersing the yellow pigment in an aqueous medium is preferably used.

As used herein, the term "water-soluble" means that a resin dissolves in distilled water in an amount of 2% by mass or more at 25° C., preferably 5% by mass or more, and more preferably 10% by mass or more. In the case where the resin has a salt-forming group, it is preferred that solubility of the resin that has been neutralized with equimolar base or acid is within the above-specified range.

Examples of the water-soluble resin include hydrophilic high-molecular weight compounds.

Examples of the water-soluble resin in accordance with the present invention include polyvinyls, polyurethanes, and polyesters. Among these, polyvinyls are preferable.

Further, the water-soluble resin in accordance with the present invention is preferably a water-soluble resin having a functional group which is crosslinkable by a crosslinking agent.

The crosslinkable functional group is not particularly limited, and examples thereof include a carboxy group or a salt thereof, an isocyanato group, and an epoxy group. From the viewpoint of improving dispersibility, a carboxy group or a salt thereof is preferable, and a carboxy group is particularly preferable.

The water-soluble resin having a carboxy group is preferably a copolymer which is obtained using a carboxy group-containing monomer as a copolymerizing component.

Examples of the carboxy group-containing monomer include (meth)acrylic acid, β-carboxyethylacrylate, fumaric acid, itaconic acid, maleic acid, and crotonic acid. Among these, (meth)acrylic acid or β-carboxyethylacrylate is preferable from the viewpoint of crosslinkability and dispersion stability. The term "(meth)acrylic acid" means at least one of acrylic acid and methacrylic acid.

The copolymerizing components used for forming the water-soluble resin having a carboxy group preferably include at least one hydrophobic monomer. Examples of the hydrophobic monomer include alkyl(meth)acrylate having 1 to 20 carbon atoms, (meth)acrylate having an aromatic ring group, such as benzyl(meth)acrylate or phenoxyethyl(meth)acrylate, and styrene and a derivative thereof. The term "(meth)acrylate" means at least one of acrylate and methacrlate. Similarly, the term "alkyl(meth)acrylate" means at least one of alkyl acrylate and alkyl methacrlate; the term "benzyl (methacrylate)" means at least one of benzyl acrylate and alkyl methacrylate; and phenoxyethyl(meth)acrylate means at least one of phenoxyethyl acrylate and phenoxyethyl methacrylate.

Although the synthesis method of a copolymer is not particularly limited, random polymerization of vinyl monomers is preferable from the viewpoint of dispersion stability.

Among others, the water-soluble resin in accordance with the present invention is preferably a copolymer which is obtained using a carboxy group-containing monomer, and at least one of alkyl(meth)acrylate having 1 to 20 carbon atoms or (meth)acrylate having an aromatic ring group, and is more preferably a copolymer which is obtained by copolymerization of (meth)acrylic acid and benzyl(meth)acrylate (that is, a copolymer containing at least a constituent unit derived from benzyl(meth)acrylate and a constituent unit derived from (meth)acrylic acid).

The acid value of the water-soluble resin before being crosslinked is preferably in a range of from 67 to 200 mgKOH/g, and more preferably from 67 to 150 mgKOH/g, from the viewpoint of pigment dispersibility.

The acid value of the water-soluble resin after being crosslinked (crosslinked water-soluble resin) is preferably in a range of from 55 to 100 mgKOH/g, from the viewpoint of stability and ink aggregation property.

The weight-average molecular weight of the water-soluble resin before being crosslinked is not particularly limited, but is preferably in a range of from 3,000 to 100,000, more preferably from 5,000 to 80,000, and even more preferably from 10,000 to 60,000, from the viewpoint of pigment dispersibility.

The specific resin-coated yellow pigment may be prepared, for example, by dispersing a yellow pigment using a water-soluble resin to prepare a water-soluble resin-coated yellow pigment, and then crosslinking the water-soluble resin of the water-soluble resin-coated yellow pigment by a crosslinking agent.

Specifically, a pigment dispersion of the specific resin-coated yellow pigment may be prepared, for example, by a production method including a process of adding an aqueous solution containing a basic material to a mixture of a yellow pigment, a water-soluble resin dispersant, and an organic solvent capable of dissolving or dispersing the water-soluble resin dispersant, followed by dispersion treatment (a mixing-and-hydration step), a process of adding a crosslinking agent to the dispersion obtained by the dispersion treatment, followed by heating and crosslinking reaction to obtain a specific resin-coated yellow pigment (a crosslinking step), and a process of purifying the post-crosslinking water-dispersible specific resin-coated yellow pigment to remove impurities (a purification step). Through these processes, the yellow pigment can be finely dispersed and consequently a pigment dispersion with excellent storage stability can be produced.

More specifically, the pigment dispersion can be produced by, for example, the production method of a pigment dispersion disclosed in JP-A No. 2009-190379.

Further, as described above, where the yellow ink composition is a yellow ink composition for a first ink composition, the mass ratio of the crosslinked water-soluble resin to the yellow pigment [mass of crosslinked water-soluble resin/mass of yellow pigment] is 0.40 or more. In this way, color reproducibility of an image of a secondary color can be improved.

Further, the mass ratio [mass of crosslinked water-soluble resin/mass of yellow pigment] is preferably from 0.40 to 0.80, from the viewpoint of an image forming property.

Further, where the yellow ink composition is a yellow ink composition for a first ink composition, the sum of the content of the yellow pigment and the content of the crosslinked water-soluble resin based on the total amount of the yellow ink composition is preferably 4.2% by mass or more, and more preferably from 4.2% by mass to 8.5% by mass, from the viewpoint of ink stability.

Further, where the yellow ink composition is a yellow ink composition for applications other than for a first ink composition, the sum of the content of the yellow pigment and the content of the crosslinked water-soluble resin based on the total amount of the yellow ink composition is not particularly limited, but is preferably 3.5% by mass or more, and more preferably from 5.5% by mass to 8.5% by mass, from the viewpoint of image resolution or the like.

Further, where the yellow ink composition is a yellow ink composition for applications other than for a first ink composition, the mass ratio of the crosslinked water-soluble resin to the yellow pigment [mass of crosslinked water-soluble resin/mass of yellow pigment] is not particularly limited, but is preferably 0.40 or more, and more preferably from 0.40 to 0.80, from the viewpoint of ink stability or the like.

The foregoing water-soluble resin may be used in combination with a non-water-soluble resin (for example, a non-water-soluble dispersant).

The non-water-soluble resin may be a water-insoluble resin having a hydrophobic constituent unit and a hydrophilic constituent unit. The hydrophilic constituent unit is preferably a constituent unit having an acidic group, and more preferably a constituent unit having a carboxy group.

Examples of the non-water-soluble resin include a copolymer of styrene and (meth)acrylic acid; a copolymer of styrene, (meth)acrylic acid and (meth)acrylic acid ester; a copolymer of (meth)acrylic acid ester and (meth)acrylic acid; a copolymer of polyethylene glycol (meth)acrylate and (meth)acrylic acid; a copolymer of vinyl acetate and maleic acid; and a copolymer of styrene and maleic acid.

More specifically, for example, water-insoluble resins disclosed in JP-A Nos. 2005-41994, 2006-273891, 2009-084494, and 2009-191134 may be preferably used in the present invention.

—Crosslinking Agent—

The specific resin-coated yellow pigment in accordance with the present invention may be obtained by crosslinking a resin-coated yellow pigment (specifically, a water-soluble resin which coats a yellow pigment in the resin-coated yellow pigment) using a crosslinking agent.

The crosslinking agent is not particularly limited as long as it is a compound having two or more sites reactive with the water-soluble resin. From the viewpoint of excellent reactivity with a carboxy group, the crosslinking agent is preferably a compound having two or more epoxy groups (a difunctional or higher-functional epoxy compound).

Specific examples of the crosslinking agent include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylolpropane triglycidyl ether. The crosslinking agent is preferably polyethylene glycol diglycidyl ether, diethylene glycol diglycidyl ether, or trimethylolpropane triglycidyl ether.

The crosslinking agent may be a commercially available product. Examples of the commercially available product include DENACOL EX-321, EX-821, EX-830, EX-850, and EX-851 (trade names, manufactured by Nagase Chemtex Corporation).

The molar ratio of the crosslinking portion of the crosslinking agent (for example, epoxy group) and the to-be-crosslinked portion of the water-soluble resin (for example, carboxy group) is preferably in a range of from 1:1.1 to 1:10, more preferably from 1:1.1 to 1:5, and further preferably from 1:1.1 to 1:3, from the viewpoint of crosslinking rate and dispersion stability after crosslinking The average particle diameter of the specific resin-coated yellow pigment in accordance with the present invention is preferably in a range of from 10 nm to 200 nm, more preferably from 10 nm to 150 nm, still more preferably from 40 nm to 150 nm, even more preferably from 50 nm to 150 nm, and particularly preferably from 50 nm to 130 nm. When the average particle diameter is 200 nm or less, color reproducibility may be improved and a jetting property when carrying out jetting by an inkjet process may be improved. When the average particle diameter is 10 nm or more, light-fastness may be improved. Further, the particle size distribution of the specific resin-coated yellow pigment is not specifically limited and any one having a broad particle size distribution or a monodisperse particle size distribution may be used. Further, two or more kinds of specific resin-coated yellow pigments having a monodisperse particle size distribution may be used as a mixture.

Here, the average particle diameter of the specific resin-coated yellow pigment represents an average particle diameter of the specific resin-coated yellow pigment in an ink, and the above described preferable ranges may also be applied to a so-called concentrated ink dispersion which is a stage before a stage of an ink.

The average particle diameter and particle size distribution of the specific resin-coated yellow pigment in accordance with the present invention are calculated by measuring a volume-average particle diameter using the NANOTRAC particle size distribution analyzer UPA-EX150 (manufactured by Nikkiso Co., Ltd.) according to a dynamic light scattering method.

Water-Soluble Polymerizable Compound

The yellow ink composition in accordance with the present invention contains at least one water-soluble polymerizable compound.

As used herein, the term "water-soluble" means that the compound dissolves in water in an amount that gives a certain concentration. Specifically, the compound preferably has a solubility in water at 25° C. of 5% by mass or more, and more preferably 10% by mass or more. Further, the water-soluble polymerizable compound is preferably a compound that dissolves in a water-based ink composition (preferably, uniformly). The water-soluble polymerizable compound may be a compound whose solubility increases by adding a water-soluble organic solvent which is described hereinafter, whereby dissolving in an ink composition (preferably, uniformly).

As the water-soluble polymerizable compound in accordance with the present invention, the composition preferably includes at least one selected from the group consisting of compounds having a (meth)acryl ester structure in the molecule thereof and compounds having a (meth)acrylamide structure in the molecule thereof, and more preferably includes at least one compound having a (meth)acrylamide structure in the molecule thereof. As used herein, the term "(meth)acryl ester structure" refers to at least one of a methacryl ester structure and an acryl ester structure, and the term "(meth)acrylamide structure" refers to at least one of a methacrylamide structure and an acrylamide structure.

—Compound Having (Meth)acryl Ester Structure in Molecule Thereof—

The polymerizable compound having a (meth)acryl ester structure in the molecule thereof is not particularly limited as long as it is a water-soluble polymerizable compound having a (meth)acryl ester structure in the molecule thereof.

The polymerizable compound having a (meth)acryl ester structure in the molecule thereof is preferably a compound represented by formula (M-1) below.

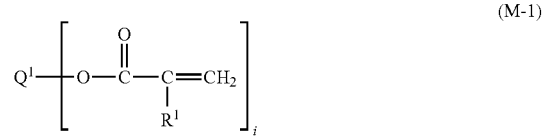

In formula (M-1), $Q^1$ represents an i-valent linking group, $R^1$ represents a hydrogen atom or a methyl group, and i represents an integer of 1 or greater.

The compound represented by formula (M-1) is a compound in which an unsaturated monomer is linked to a linking group $Q^1$ via an ester bond. $R^1$ represents a hydrogen atom or a methyl group, and preferably a hydrogen atom. The valency i of the linking group $Q^1$ is not particularly limited, but is preferably 2 or more, more preferably from 2 to 6, and even more preferably from 2 to 4.

The linking group $Q^1$ is not particularly limited as long as it can be linked to a (meth)acryl ester structure, but $Q^1$ is preferably selected from linking groups that make the compound represented by formula (M-1) satisfy the water-solubility as discussed above. Specific examples of $Q^1$ include residues obtained by eliminating one or more hydrogen atoms or hydroxyl groups from a compound selected from the following compound group X.

—Compound Group X—

The compound group X includes: polyols such as ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentyl glycol, pentaerythritol, dipentaerythritol, condensates thereof, low-molecular-weight polyvinyl alcohols, and sugars; and polyamines such as ethylenediamine, diethylenetriamine, triethylenetetramine, polyethyleneimine, and polypropylenediamine.

Examples of the linking group $Q^1$ further include a substituted or unsubstituted alkylene chain having 4 or less carbon atoms, such as a methylene group, an ethylene group, a propylene group or a butylene group; and a functional group having a saturated or unsaturated hetero ring such as a pyridine ring, an imidazole ring, a pyrazine ring, a piperidine ring, a piperazine ring or a morpholine ring.

Among these, the linking group $Q^1$ is preferably a residue of polyols containing an oxyalkylene group (preferably, an oxyethylene group), and particularly preferably a residue of polyols containing three or more oxyalkylene groups (preferably, oxyethylene groups).

Specific examples of the water-soluble polymerizable compound having a (meth)acryl ester structure in the molecule thereof include, but are not limited to, the following nonionic compounds.

—Compound Having (Meth)acrylamide Structure in Molecule Thereof—

The compound having a (meth)acrylamide structure in the molecule thereof is not particularly limited as long as it is a polymerizable compound having a (meth)acrylamide structure in the molecule thereof.

The compound having a (meth)acrylamide structure in the molecule thereof is preferably a compound represented by formula (M-2) given below. Having the structure of formula (M-2) may lead to an increase in compatibility between the compound represented by formula (1) which is described hereinafter and the polymerizable compound, whereby curing sensitivity or the like may be preferably enhanced.

Nonionic compound 1

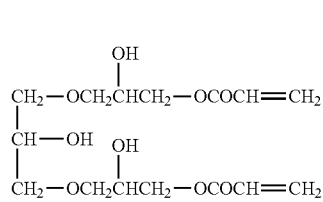

Nonionic compound 2

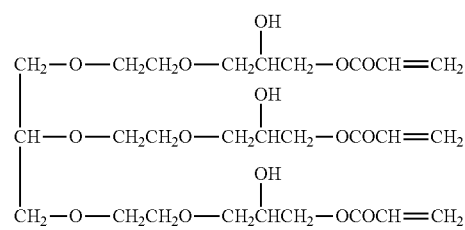

Nonionic compound 3

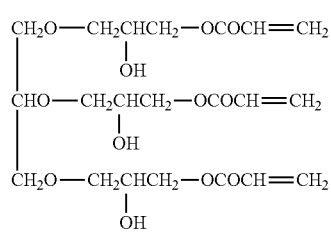

Nonionic compound 4

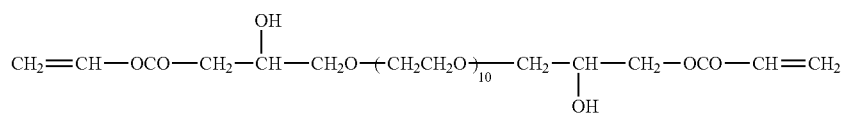

Nonionic compound 5

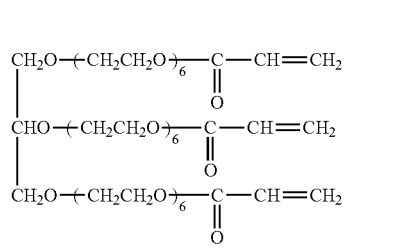

Nonionic compound 6

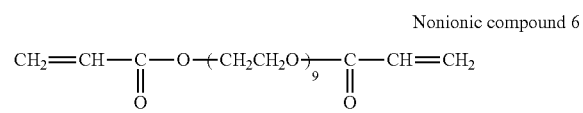

Examples of the nonionic polymerizable compound further include (meth)acrylic acid esters having at least two acryloyl groups in one molecule derived from a polyol compound. Examples of the polyol compound include polyol compounds having at least two hydroxyl groups such as condensates of glycols, oligoethers and oligoesters, monosaccharides and disaccharides.

Further, (meth)acrylate esters of triethanolamine, diethanolamine, trishydroxyaminomethane or trishydroxyaminoethane are also preferred.

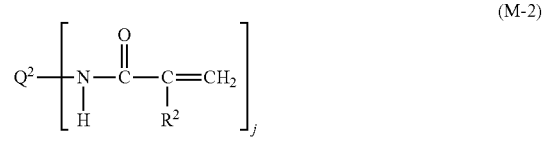

(M-2)

In formula (M-2), $Q^2$ represents a j-valent linking group, $R^2$ represents a hydrogen atom or a methyl group, and j represents an integer of 1 or greater.

The compound represented by formula (M-2) is a compound in which an unsaturated monomer is linked to a linking group $Q^2$ via an amide bond. $R^2$ represents a hydrogen atom or a methyl group, and preferably a hydrogen atom. The valency j of the linking group $Q^2$ is not particularly limited, but is preferably 2 or more, more preferably from 2 to 6, and even more preferably from 2 to 4.

The linking group $Q^2$ is not particularly limited as long as it can be linked to a (meth)acrylamide structure. Details of the linking group $Q^2$ are the same as those of the linking group $Q^1$, and the preferred embodiment is also the same.

Specific examples of the water-soluble polymerizable compound having a (meth)acrylamide structure in the molecule thereof include the following water-soluble polymerizable compounds.

Polymerizable compound 1

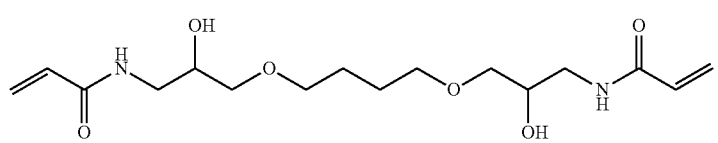

Polymerizable compound 2

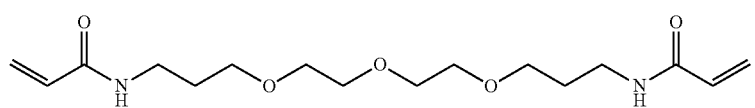

Polymerizable compound 3

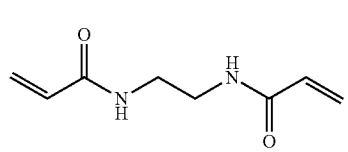

Polymerizable compound 4

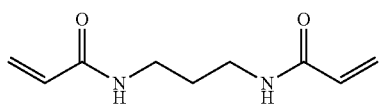

Polymerizable compound 5

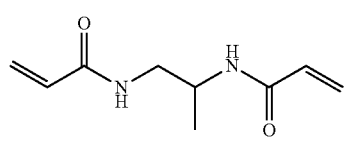

Polymerizable compound 6

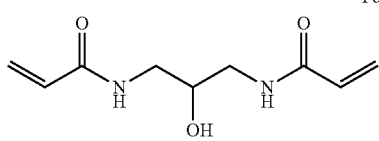

Polymerizable compound 7

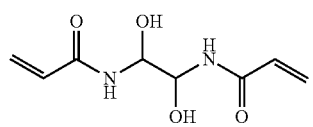

Polymerizable compound 8

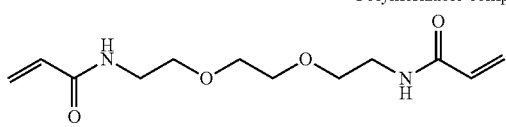

Polymerizable compound 9

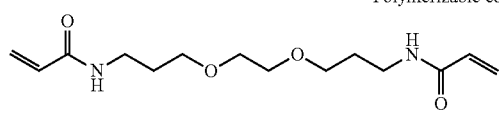

Polymerizable compound 10

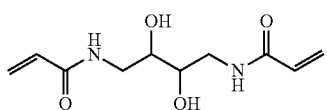

Polymerizable compound 11

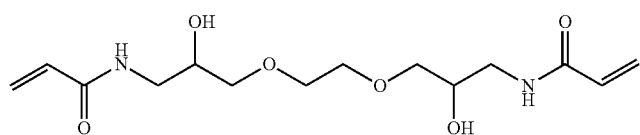

Polymerizable compound 12

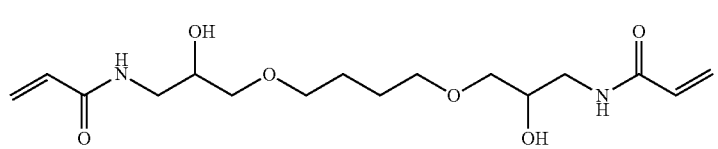

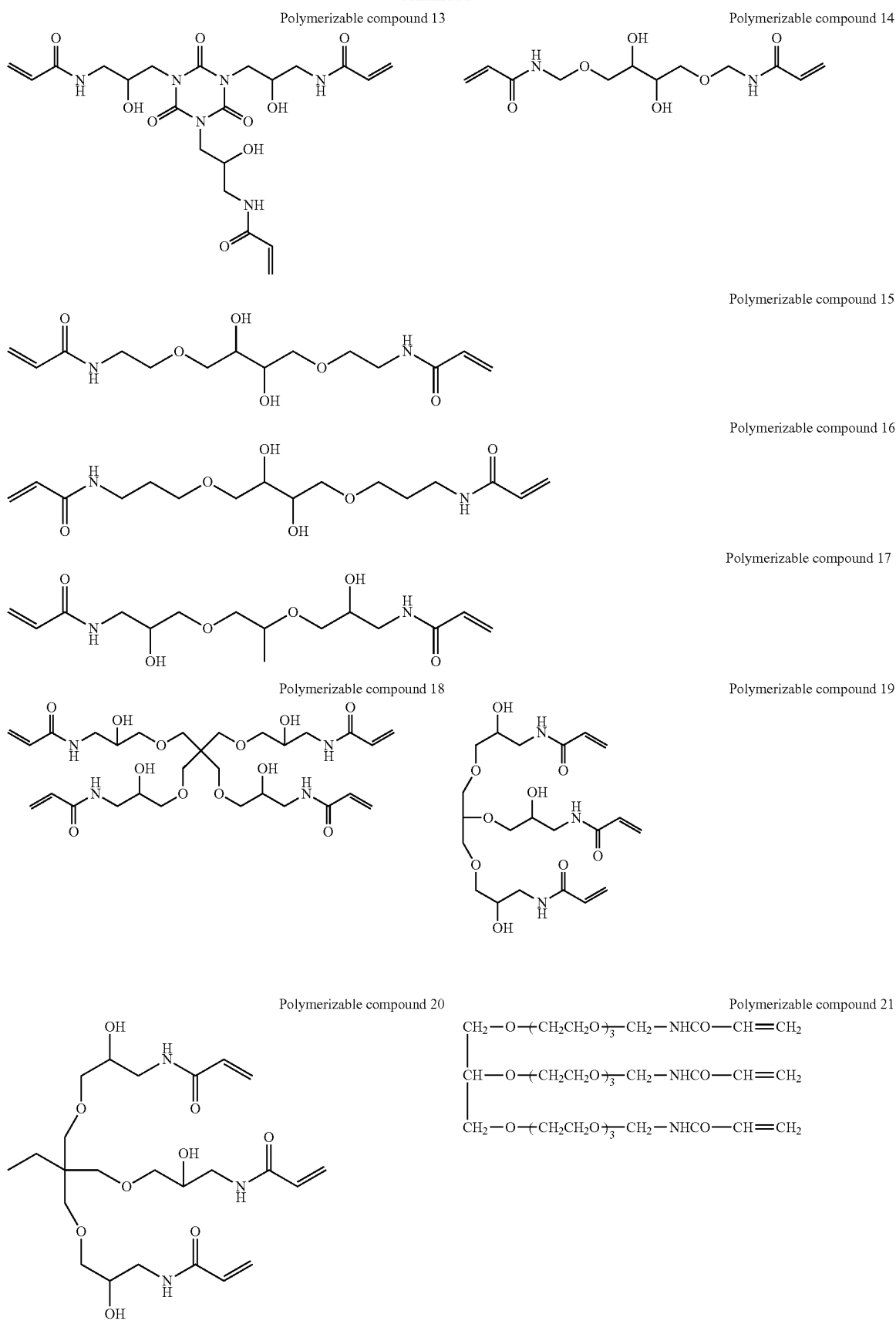

-continued
Polymerizable compound 22
C—[CH₂—O—(CH₂CH₂O)₃—CH₂—NHCO—CH=CH₂]₄
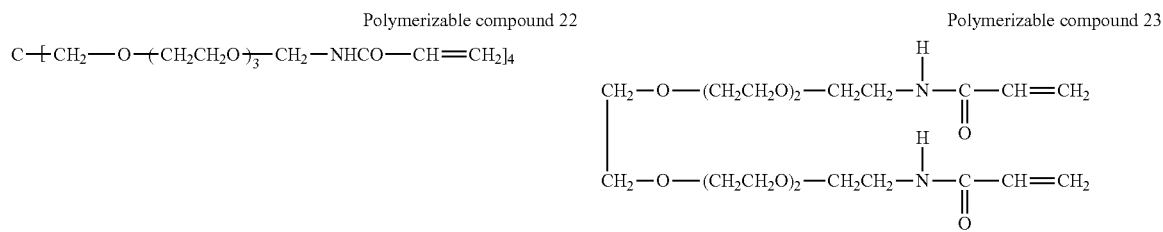
Polymerizable compound 23
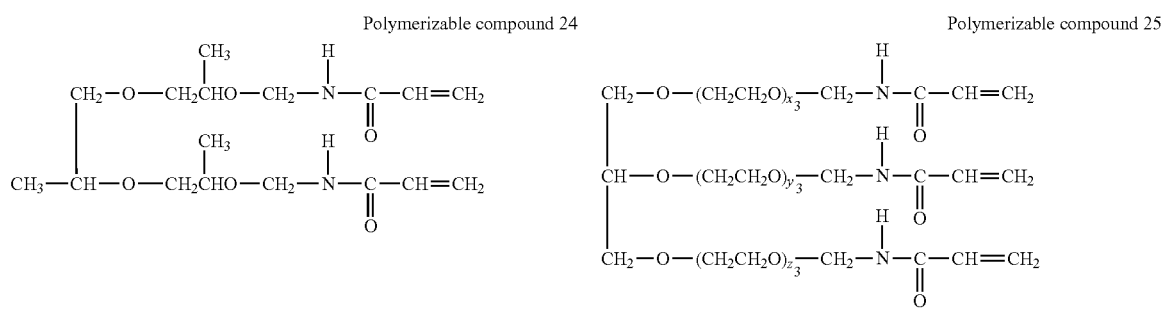
Polymerizable compound 24
Polymerizable compound 25
$x_3 + y_3 + z_3 = 6$
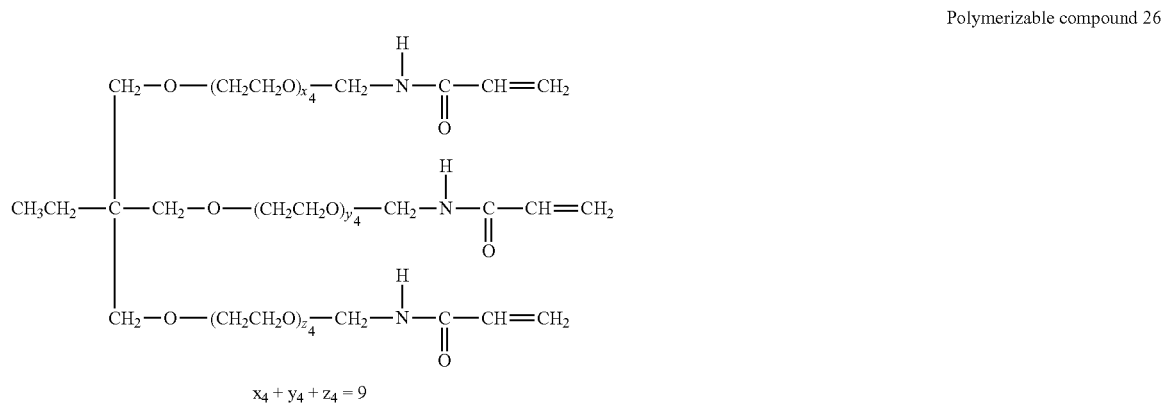
Polymerizable compound 26
$x_4 + y_4 + z_4 = 9$
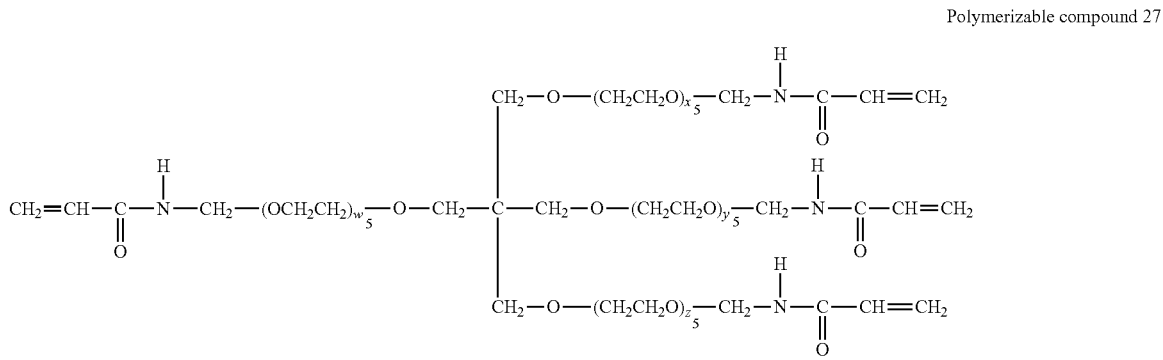
Polymerizable compound 27
$w_5 + x_5 + y_5 + z_5 = 6$ -continued
Polymerizable compound 28
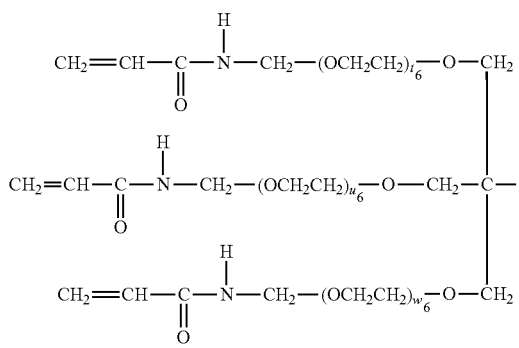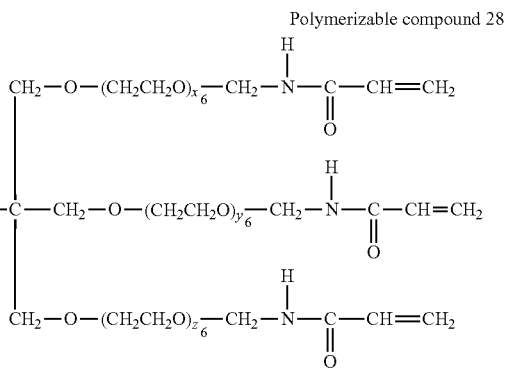
$t_6 + u_6 + w_6 + x_6 + y_6 + z_6 = 12$
Polymerizable compound 29
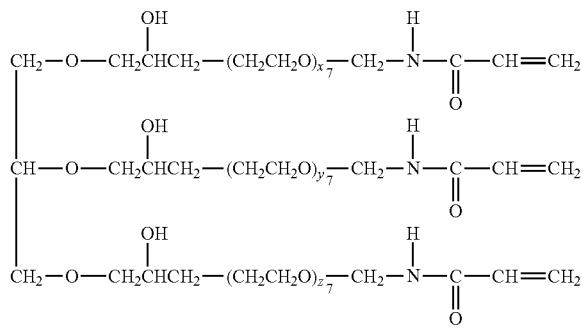
$x_7 + y_7 + z_7 = 3$
Polymerizable compound 30
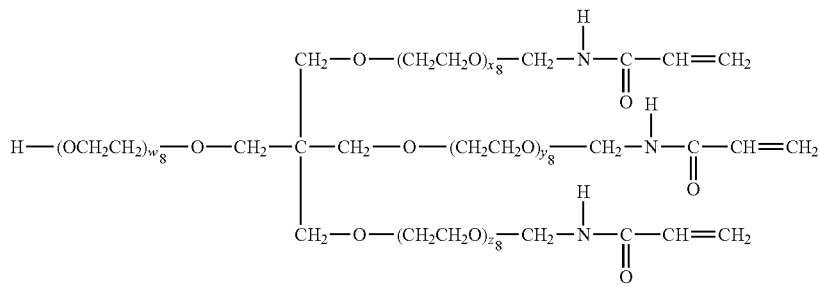
$w_8 + x_8 + y_8 + z_8 = 6$
Polymerizable compound 31
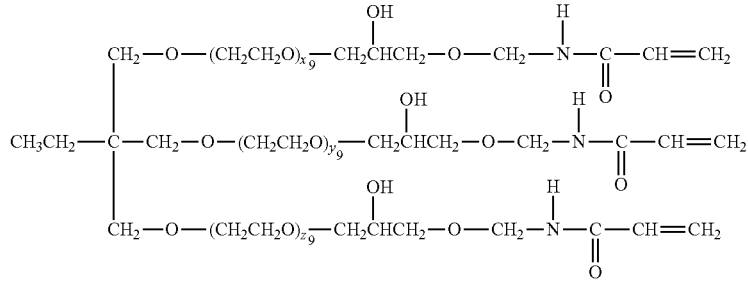
$x_9 + y_9 + z_9 = 3$
Polymerizable compound 32
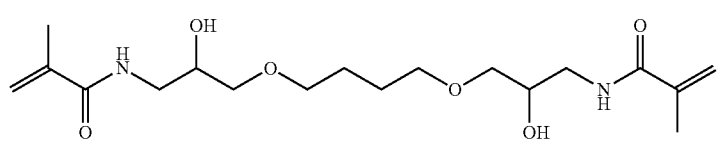

The ink composition may include a compound having a maleimide structure, a compound having a sulfamide structure, a compound having an N-vinylacetamide structure or the like.

Polymerizable compound 33

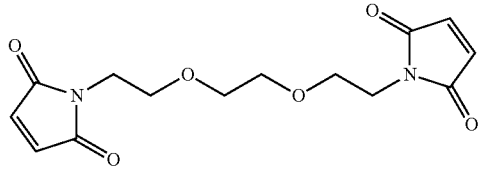

Polymerizable compound 34

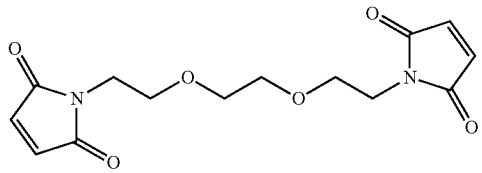

Polymerizable compound 35

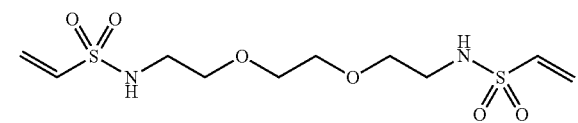

Polymerizable compound 36

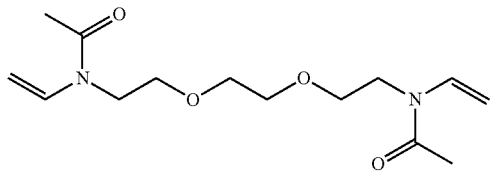

Polymerizable compound 37

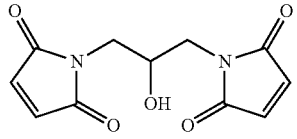

Polymerizable compound 38

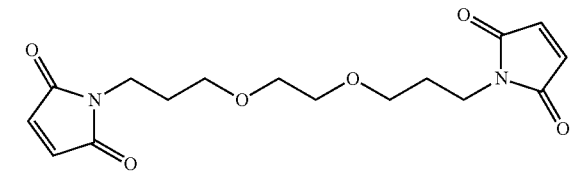

Polymerizable compound 39

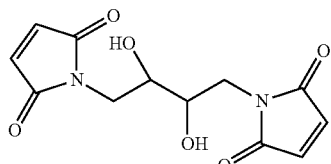

Polymerizable compound 40

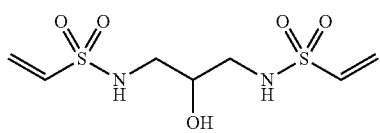

Polymerizable compound 41

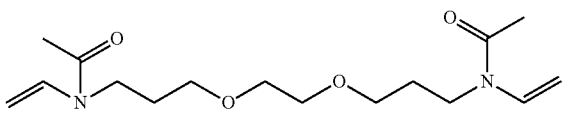

Polymerizable compound 42

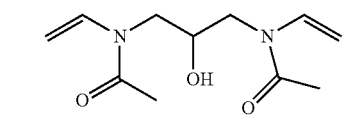

The water-soluble polymerizable compound in accordance with the present invention is preferably difunctional or higher-functional as described above. The water-soluble polymerizable compound is preferably a difunctional to hexafunctional monomer from the viewpoint of increasing rubbing-off resistance, and is preferably a difunctional to tetrafunctional monomer from the viewpoint of achieving both solubility and rubbing-off resistance.

One kind of the water-soluble polymerizable compound may be used alone or two or more kind thereof may be used in combination.

The content of the water-soluble polymerizable compound(s) in the ink composition is preferably in the range of 4 to 30% by mass, and more preferably 15 to 25% by mass.

With respect to the ratio of the content of the water-soluble polymerizable compound(s) relative to the solid content of pigment(s), a ratio of the solid content of the pigment(s): the content of the water soluble polymerizable compound(s) is preferably from 1:1 to 1:30, and more preferably from 1:3 to 1:15. If the content of the polymerizable compound is equal to or greater than that of the pigment, image intensity may be further improved to result in excellent rubbing-off resistance of the image. If the content of the polymerizable compound is 30 times or less than that of the pigment, it is advantageous in terms of pile height.

In the water-soluble polymerizable compound in accordance with the present invention, the ratio of the molecular weight of the polymerizable compound relative to the number of the polymerizable functional groups contained in a single molecule of the compound, that is, the value obtained by dividing the molecular weight of the water-soluble polymerizable compound by the number of the polymerizable functional groups contained in one molecule (molecular weight of the polymerizable compound/number of the contained polymerizable functional groups; which is sometimes also referred to as an "A value") is preferably 175 or less, and more preferably 165 or less, from the viewpoint of curing sensitivity and blocking resistance of an image to be formed. The A value is preferably 84 or more from the viewpoint in terms of the structure.

For example, the A value for some of specific examples of the foregoing water-soluble polymerizable compound is as follows: polymerizable compound 1 (A value: 172.2), polymerizable compound 2 (A value: 164.2), polymerizable compound 3 (A value: 84.1), polymerizable compound 34 (A value: 154.1), polymerizable compound 35 (A value: 164.2), and polymerizable compound 36 (A value: 142.2).

From the viewpoint of curing sensitivity and blocking resistance, the water-soluble polymerizable compound in accordance with the present invention is preferably a compound which has two or more polymerizable functional groups selected from the group consisting of a (meth)acrylamide group, a maleimide group, a vinylsulfone group and an N-vinylamide group, and has an A value of 175 or less, more preferably a compound which has two or more polymerizable functional groups selected from the group consisting of a (meth)acrylamide group, a maleimide group, a vinylsulfone group and an N-vinylamide group, and has an A value of from 84 to 175, even more preferably a compound which has two or more polymerizable functional groups selected from the group consisting of a (meth)acrylamide group, a maleimide group, a vinylsulfone group and an N-vinylamide group, and has an A value of from 84 to 165 or less, and particularly preferably a compound which has at least two or more (meth) acrylamide groups and has an A value of from 84 to 165.

The water-soluble polymerizable compound is preferably a compound which has two or more polymerizable functional groups selected from the group consisting of a (meth)acrylamide group, a maleimide group, a vinylsulfone group and an N-vinylamide group, and a nonionic hydrophilic group, and has an A value of from 84 to 175, more preferably a compound which has two or more polymerizable functional groups selected from the group consisting of a (meth)acrylamide group, a maleimide group, a vinylsulfone group and an N-vinylamide group, and at least one nonionic hydrophilic group selected from oxyalkylene groups, oligomers thereof and a hydroxyl group, and has an A value of from 84 to 165, and particularly preferably a compound which has two or more (meth)acrylamide groups, and at least one nonionic hydrophilic group selected from the group consisting of oxyalkylene groups, oligomers thereof and a hydroxyl group, and has an A value of from 84 to 165.

Photopolymerization Initiator

The yellow ink composition in accordance with the present invention preferably contains at least one photopolymerization initiator.

The photopolymerization initiator is preferably a water-soluble photopolymerization initiator.

As used herein, the term "water-soluble" with regard to the photopolymerization initiator means that the photopolymerization initiator dissolves in distilled water in an amount of 0.5% by mass or more at 25° C. The water-soluble photopolymerization initiator is preferably dissolved in distilled water in an amount of 1% by mass or more at 25° C., and more preferably 3% by mass or more.

Further, as the photopolymerization initiator, a photopolymerization initiator capable of initiation of polymerization of the water-soluble polymerizable compound by active energy radiation (for example, ultraviolet rays) can be appropriately used.

Examples of the water-soluble photopolymerization initiator include a compound represented by formula (1) below and a compound disclosed in JP-A No. 2005-307198. Among them, a water-soluble photopolymerization initiator represented by formula (1) below is preferable from the viewpoint of adhesiveness and rubbing-off resistance.

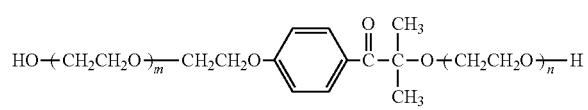

(1)

In formula (1), m and n each independently represent an integer of 0 or greater, m+n represents an integer of from 0 to 3. Preferably, m represents from 0 to 3, and n represents 0 or 1. More preferably, m represents 0 or 1 and n represents 0.

Specific examples of the compound represented by formula (1) are given below, but the present invention is not limited thereto.

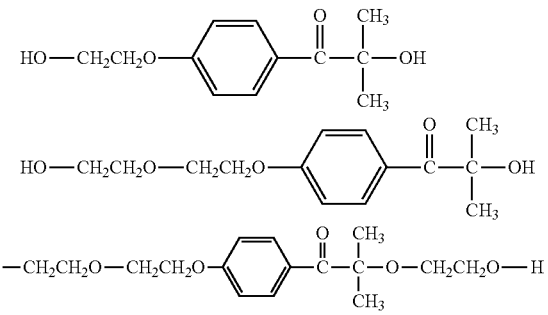

The compound represented by formula (1) may be, for example, a compound synthesized according to the method disclosed in JP-A No. 2005-307198 or the like. The compound represented by formula (1) may be a commercially available compound. An example of the commercially available compound represented by formula (1) may be IRGACURE 2959 (m=0, n=0).

The content of a photopolymerization initiator(s) in the yellow ink composition in accordance with the present invention is preferably in a range of 0.1 to 30% by mass in terms of solid content, more preferably 0.5 to 20% by mass, even more preferably 1.0 to 15% by mass, and most preferably 1.0 to 5.0% by mass.

Surfactant

The yellow ink composition in accordance with the present invention preferably contains at least one kind of surfactant. The surfactant may be used as a surface tension conditioner.

As the surface tension conditioner, a compound with a structure containing hydrophilic and hydrophobic moieties within the molecule thereof can be effectively used. Any of an anionic surfactant, a cationic surfactant, an amphoteric surfactant, a nonionic surfactant, or a betaine surfactant may be used.

In the present invention, a nonionic surfactant is preferable from the viewpoint of preventing interference between jetted droplets of an ink composition. Among them, an acetylene glycol surfactant is more preferable.

Examples of the acetylene glycol surfactant include 2,4,7,9-tetramethyl-5-decyne-4,7-diol, and alkylene oxide adducts of 2,4,7,9-tetramethyl-5-decyne-4,7-diol. At least one selected therefrom is preferable as the acetylene glycol surfactant. Examples of commercially available products of these compounds include E series manufactured by Nissin Chemical Industry Co., Ltd., such as OLFINE E1010 (trade name; manufactured by Nissin Chemical Industry Co., Ltd.).

When the surfactant (surface tension conditioner) is incorporated in a yellow ink composition, the surfactant is incorporated in such an amount that the surface tension of the ink composition is adjusted within a range of preferably from 20 mN/m to 60 mN/m from the viewpoint of favorably performing the jetting of the yellow ink composition by an inkjet process. The surface tension is more preferably in a range of from 20 mN/m to 45 mN/m and still more preferably from 25 mN/m to 40 mN/m.

The content of the surfactant(s) in the yellow ink composition is not particularly limited, and is preferably in a range that the aforementioned range of the surface tension is attained. The content of the surfactant(s) in the ink composition is preferably 0.1% by mass or more, more preferably from 0.1% by mass to 10% by mass, and still more preferably from 0.2% by mass to 3% by mass.

Water-Soluble Organic Solvent

The yellow ink composition in accordance with the present invention contains water, and optionally, may contain at least one kind of water-soluble organic solvent in addition to water.

Use of the water-soluble organic solvent can provide effects of preventing drying and promoting wetting or penetration. For the purpose of preventing drying, a water-soluble organic solvent may be used as an anti-drying agent capable of preventing clogging of an orifice resulting from adhering, drying and aggregation of an ink in an ink jetting orifice of a spray nozzle. For the purpose of preventing drying and promoting wetting, a water-soluble organic solvent having lower vapor pressure than water is preferred. For the purpose of promoting penetration, a water-soluble organic solvent may be used as a penetration promoting agent for enhancing penetrability of ink to paper.

Examples of the water-soluble organic solvent include: alkane diols (polyols) such as glycerin, ethylene glycol, and propylene glycol; sugar alcohols; alkyl alcohols having from 1 to 4 carbon atoms, such as ethanol, methanol, butanol, propanol, and isopropanol; and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether. One kind of these water-soluble organic solvent may be used alone or two or more kinds thereof may be used in combination.

Additional Component

The yellow ink composition in accordance with the present invention may optionally further contain one or more additional components, in addition to the above-mentioned components. Examples of the additional component include colloidal silica, resin particles, and various additives.

When the yellow ink composition in accordance with the present invention contains colloidal silica, jetting stability can be improved and deterioration of liquid repellency in an inkjet head member can be prevented. In particular, incorporation of colloidal silica is significantly effective particularly where silicone is used in at least a portion of an inkjet head member.

As the colloidal silica, for example, known colloidal silica disclosed in JP-A No. 2002-206063 may be used.

The resin particles preferably have a function of aggregating themselves or making the dispersing state thereof unstable, whereby increasing ink viscosity so as to fix the ink composition, that is, an image, when the resin particles contact the below-mentioned treatment liquid or the region of a recording medium onto which the treatment liquid has been applied and dried. Such resin particles are preferably dispersed in at least one of water or an organic solvent.

Examples of the resin particles include acrylic resin particles, vinyl acetate resin particles, styrene-butadiene resin particles, vinyl chloride resin particles, acryl-styrene resin particles, butadiene resin particles, styrene resin particles, crosslinked acrylic resin particles, crosslinked styrene resin particles, benzoguanamine resin particles, phenol resin particles, silicone resin particles, epoxy resin particles, urethane resin particles, paraffin resin particles, fluoro resin particles, and latexes of any of these resins. Preferred examples thereof include acrylic resin particles, acryl-styrene resin particles, styrene resin particles, crosslinked acrylic resin particles, and crosslinked styrene resin particles.

The resin particles may be used in the form of a latex.

The weight-average molecular weight of the resin particles is preferably from 10,000 to 200,000 and more preferably from 20,000 to 200,000.

The average particle diameter of the resin particles is preferably in a range of from 1 nm to 1 μm, more preferably from 1 nm to 200 nm, still more preferably from 1 nm to 100 nm, and particularly preferably from 1 nm to 50 nm.

The glass transition temperature (Tg) of the resin particles is preferably 30° C. or higher, more preferably 40° C. or higher, and still more preferably 50° C. or higher.

From the viewpoint of more effectively achieving the effect of the present invention, the content of the resin particles is preferably in a range of 5% by mass or less based on the total amount of the ink composition, more preferably 3% by mass or less, and particularly preferably 1% by mass or less.

Examples of the various additives include known additives such as an ultraviolet absorber, an anti-color fading agent, an anti-mold agent, a pH-adjusting agent, an anti-corrosion agent, an antioxidant, an emulsion stabilizer, a preservative, an anti-foaming agent, a viscosity modifier, a dispersion stabilizer, and a chelating agent. The content of these additives may be appropriately determined depending on desired applications. For example, the content of each additive may be in a range of 0.02 to 1.00% by mass in a black ink composition.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

As the anti-fading agent, various kinds of organic and metal complex anti-fading agents may be used. Examples of the organic anti-fading agents include hydroquinones, alkoxyphenols, dialkoxyphenols, phenols, anilines, amines, indanes, chromanes, alkoxyanilines, and hetero rings. Examples of the metal complex include nickel complexes and zinc complexes.

Examples of the anti-mold agent include sodium dehydroacetate, sodium benzoate, sodium pyridinethione-1-oxide, p-hydroxybenzoic acid ethyl ester, 1,2-benzisothiazolin-3-one, sodium sorbate, and sodium pentachlorophenol.

The pH-adjusting agent is not particularly limited as long as it can control the pH to a desired value without bringing an adverse effect to the ink composition. The pH-adjusting agent may be selected appropriately in accordance with purposes. Examples of the pH-adjusting agent include: alcohol amines (for instance, diethanolamine, triethanolamine, and 2-amino-2-ethyl-1,3-propanediol); alkali metal hydroxides (for instance, lithium hydroxide, sodium hydroxide, and potassium hydroxide); ammonium hydroxides (for instance, ammonium hydroxide, and quaternary ammonium hydroxide); phosphonium hydroxides; and alkali metal carbonates.

Examples of the anti-corrosion agent include acidic sulfites, sodium thiosulfate, ammonium thiodiglycolate, diisopropyl ammonium nitrite, pentaerythritol tetranitrate, and dicyclohexyl ammonium nitrite.

Examples of the antioxidant include a phenol antioxidant (including a hindered phenol antioxidant), an amine antioxidant, a sulfur antioxidant, and a phosphorous antioxidant.

Examples of the chelating agent include sodium ethylenediamine tetraacetic acid; sodium nitrilotriacetic acid; sodium hydroxyethyl ethylenediamine triacetic acid; sodium diethylene triamine pentaacetic acid; and sodium uramil diacetic acid.

Properties of Yellow Ink Composition

The yellow ink composition in accordance with the present invention has a surface tension (25° C.) of preferably from 20 mN/m to 60 mN/m, more preferably from 20 mN/m to 45 mN/m, and still more preferably from 25 mN/m to 40 mN/m.

The surface tension is measured with an automatic surface tensiometer CBVP-Z (trade name, manufactured by Kyowa Interface Science Co., Ltd.) under the condition that the temperature of the ink composition is 25° C.

The yellow ink composition in accordance with the present invention has a viscosity of preferably from 1.2 mPa·s to 15.0 mPa·s at 25° C., more preferably 2 mPa·s or more and less than 13 mPa·s, and still more preferably 2.5 mPa·s or more and less than 10 mPa·s.

The viscosity of the yellow ink composition is measured with VISCOMETER TV-22 (trade name, manufactured by Toki Sangyo Co., Ltd.) while an ink composition to be measured is conditioned at 25° C.

Preparation Method

The yellow ink composition may be prepared by a usual method. For example, the ink composition may be prepared by mixing a pigment dispersion containing the specific resin-coated yellow pigment, at least one water-soluble polymerizable compound and water, and optionally a photopolymerization initiator, a water-soluble organic solvent and a surfactant. The mixing method is not particularly limited, and the commonly used mixing method may be appropriately selected and applied.

<Magenta Ink Composition>

The ink set in accordance with the present invention includes at least one magenta ink composition containing a resin-coated magenta pigment in which a magenta pigment is coated with a crosslinked water-soluble resin, a water-soluble polymerizable compound and water.

Resin-Coated Magenta Pigment in which Magenta Pigment is Coated with Crosslinked Water-Soluble Resin The magenta ink composition contains a resin-coated magenta pigment (hereinafter, also referred to as a "specific resin-coated magenta pigment") which is obtained by a method including dispersing a magenta pigment using a water-soluble resin and then crosslinking the water-soluble resin using a crosslinking agent.

The specific resin-coated magenta pigment has a configuration in which a magenta pigment is coated by a crosslinked water-soluble resin, that is, a configuration in which a magenta pigment is coated with a water-soluble resin, and the water-soluble resin is crosslinked. Here, the magenta pigment may be completely or partially coated. An example of a method for producing the specific resin-coated magenta pigment is the same as in an example of the method for producing the specific resin-coated yellow pigment, except that a magenta pigment is used in place of a yellow pigment in the production method of the specific resin-coated yellow pigment.

—Magenta Pigment—

Examples of the magenta pigment include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222, and C.I. Pigment Violet 19.

Among these, at least one selected from C.I. Pigment Red 122, C.I. Pigment Red 202, C.I. Pigment Red 209, and C.I. Pigment Violet 19 is preferable from the viewpoint of adhesiveness and rubbing-off resistance.

Where a magenta ink composition is a magenta ink composition for a first in composition, the content of the magenta pigment is in a range of from 4.2 to 6.0% by mass based on the total amount of the magenta ink composition. In this way, color reproducibility of a secondary color may be improved. When the content of the magenta pigment is 4.2% by mass or more, color reproducibility of a magenta monochromatic image may also be improved.

Where a magenta ink composition is a magenta ink composition for applications other than for a first ink composition, the content of the magenta pigment based on the total amount of the magenta ink composition is not particularly limited, but is more preferably in a range of from 4.2 to 6.0% by mass from the viewpoint of image resolution or the like.

The magenta ink composition may include a known pigment other than and in addition to the magenta pigment, within the scope of not impairing the effect of the present invention.

—Water-Soluble Resin—

As the water-soluble resin for coating the magenta pigment, a water-soluble resin dispersant for dispersing the magenta pigment in an aqueous medium is preferably used.

The preferred range of the water-soluble resin for coating the magenta pigment is the same as the preferred range of the water-soluble resin for coating the yellow pigment.

Further, as described above, where the magenta ink composition is a magenta ink composition for a first ink composition, the mass ratio of the crosslinked water-soluble resin to the magenta pigment [mass of crosslinked water-soluble resin/mass of magenta pigment] is 0.25 or more. In this way, color reproducibility of a secondary color can be improved. When the mass ratio is 0.25 or more, color reproducibility of a magenta monochromatic image is also improved.

Further, the mass ratio [mass of crosslinked water-soluble resin/mass of magenta pigment] is preferably from 0.25 to 0.6, from the viewpoint of a delineation property.

Further, where the magenta ink composition is a magenta ink composition for the first ink composition, the sum of the content of the magenta pigment and the content of the crosslinked water-soluble resin based on the total amount of the magenta ink composition is preferably 5.25% by mass or more, and more preferably from 5.25% by mass to 8.0% by mass, from the viewpoint of ink stability.

Further, where the magenta ink composition is a magenta ink composition for applications other than for the first ink composition, the sum of the content of the magenta pigment and the content of the resin based on the total amount of the magenta ink composition is not particularly limited, but is preferably 5.5% by mass or more, and more preferably from 5.5% by mass to 8.0% by mass, from the viewpoint of color reproducibility of an image.

Further, where the magenta ink composition is a magenta ink composition for applications other than for the first ink composition, the mass ratio of the crosslinked water-soluble resin to the magenta pigment [mass of crosslinked water-soluble resin/mass of magenta pigment] is not particularly limited, but is preferably more than 0.25, and more preferably more than 0.25 to 0.6 or less, from the viewpoint of ink stability or the like.

The average particle diameter of the specific resin-coated magenta pigment in accordance with the present invention is preferably in a range of from 10 nm to 200 nm, more preferably from 10 nm to 150 nm, still more preferably from 50 nm to 150 nm, even more preferably from 50 nm to 120 nm, further preferably from 50 nm to 100 nm and particularly preferably from 50 nm to 90 nm. If the average particle diameter is 200 nm or less, color reproducibility can be improved and a jetting property when carrying out jetting by an inkjet process can be improved. If the average particle diameter is 10 nm or more, light-fastness can be improved. Further, the particle size distribution of the specific resin-coated magenta pigment is not specifically limited and any one having a broad particle size distribution or a monodisperse particle size distribution may be used. Further, two or more kinds of specific resin-coated magenta pigments having a monodisperse particle size distribution may be used as a mixture.

The average particle diameter of the specific resin-coated magenta pigment represents an average particle diameter of the specific resin-coated magent pigment in an ink, and the above described preferable ranges may also be applied to a so-called magenta pigment dispersion which is a stage before a stage of an ink.

The average particle diameter and particle size distribution of the specific resin-coated magenta pigment in accordance with the present invention are obtained by measuring a volume-average particle diameter using the NANOTRAC particle diameter distribution analyzer UPA-EX150 (trade name; manufactured by Nikkiso Co., Ltd.) according to a dynamic light scattering method.

With regard to the magenta ink composition, individual components other than the foregoing components (a water-soluble polymerizable compound, and a photopolymerization initiator, a surfactant, a water-soluble organic solvent, and additional components which may be optionally used) and preferred ranges thereof, and the preferred range of the magenta ink composition (including production method) are the same as those of the aforementioned yellow ink composition.

<Cyan Ink Composition>

The ink set in accordance with the present invention includes at least one cyan ink composition containing a resin-coated cyan pigment in which a cyan pigment is coated with a crosslinked water-soluble resin, a water-soluble polymerizable compound and water.

Resin-Coated Cyan Pigment in which Cyan Pigment is Coated with Crosslinked Water-Soluble Resin The cyan ink composition contains a resin-coated cyan pigment (hereinafter, also referred to as a "specific resin-coated cyan pigment") which is obtained by a method including dispersing a cyan pigment using a water-soluble resin and then crosslinking the dispersed water-soluble resin using a crosslinking agent.

The specific resin-coated cyan pigment has a configuration in which a cyan pigment is coated by a crosslinked water-soluble resin, that is, a configuration in which a cyan pigment is coated with a water-soluble resin, and the water-soluble resin is crosslinked. Here, the cyan pigment may be completely or partially coated. An example of a method for producing the specific resin-coated cyan pigment is the same as in an example of the method for producing the specific resin-coated yellow pigment, except that a cyan pigment is used in place of a yellow pigment in the production method of the specific resin-coated yellow pigment.

—Cyan Pigment—

Examples of the cyan pigment include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Among these, at least one selected from C.I. Pigment Blue 15:3, C.I. Pigment Blue 15:4, or C.I. Pigment Blue 16 is preferable, and at least one of C.I. Pigment Blue 15:3 or C.I. Pigment Blue 15:4 is particularly preferable.

Where a cyan ink composition is a cyan ink composition for the first ink composition, the content of the cyan pigment is in a range of from 2.0 to 4.0% by mass based on the total amount of the cyan ink composition. In this way, color reproducibility of a secondary color may be improved.

Further, where a cyan ink composition is a cyan ink composition for applications other than for the first ink composition, the content of the cyan pigment based on the total amount of the cyan ink composition is not particularly limited, but is more preferably in a range of from 2.0 to 4.0% by mass from the viewpoint of image resolution or the like.

The cyan ink composition may include a known pigment other than and in addition to the cyan pigment, within the scope of not impairing the effect of the present invention.

—Water-Soluble Resin—

As the water-soluble resin for coating the cyan pigment, a water-soluble resin dispersant for dispersing the cyan pigment in an aqueous medium is preferably used.

The preferred range of the water-soluble resin for coating the cyan pigment is the same as the preferred range of the water-soluble resin for coating the yellow pigment.

Where the cyan ink composition is a cyan ink composition for the first ink composition, the mass ratio of the crosslinked water-soluble resin to the cyan pigment [mass of crosslinked water-soluble resin/mass of cyan pigment] is 0.40 or more. In this way, color reproducibility of a secondary color is improved.

The mass ratio [mass of crosslinked water-soluble resin/mass of cyan pigment] is preferably from 0.40 to 0.80, from the viewpoint of a delineation property.

Where the cyan ink composition is a cyan ink composition for the first ink composition, the sum of the content of the cyan pigment and the content of the crosslinked water-soluble resin based on the total amount of the cyan ink composition is preferably 2.8% by mass or more, and more preferably from 2.8% by mass to 5.0% by mass, from the viewpoint of ink stability.

Where the cyan ink composition is a cyan ink composition for applications other than for the first ink composition, the sum of the content of the cyan pigment and the content of the crosslinked water-soluble resin based on the total amount of the cyan ink composition is not particularly limited, but is preferably 2.8% by mass or more, and more preferably from 2.8% by mass to 6.0% by mass, from the viewpoint of image resolution or the like.

Where the cyan ink composition is a cyan ink composition for applications other than for the first ink composition, the mass ratio of the crosslinked water-soluble resin to the cyan pigment [mass of crosslinked water-soluble resin/mass of cyan pigment] is not particularly limited, but is preferably 0.40 or more, and more preferably from 0.40 to 0.80, from the viewpoint of image resolution or the like.

The average particle diameter of the specific resin-coated cyan pigment in accordance with the present invention is preferably in a range of from 10 nm to 200 nm, more preferably from 10 nm to 150 nm, still more preferably from 40 nm to 150 nm, still further preferably 50 nm to 150 nm, even more preferably 50 nm to 120 nm, further preferably 50 to 100 nm and particularly preferably 50 nm to 90 nm. If the average particle diameter is 200 nm or less, color reproducibility may be improved and a jetting property when carrying out jetting by an inkjet process may be improved. If the average particle diameter is 10 nm or more, light-fastness may be improved. The particle size distribution of the specific resin-coated cyan pigment is not specifically limited and any one having a broad particle size distribution or a monodisperse particle size distribution may be used. Further, two or more kinds of specific resin-coated cyan pigments having a monodisperse particle size distribution may be used as a mixture.

Here, the average particle diameter of the specific resin-coated cyan pigment represents an average particle diameter of the specific resin-coated cyan pigment in an ink, and above described preferable ranges may also apply to a so-called concentrated ink dispersion which is a stage before a stage of an ink.

The average particle diameter and particle size distribution of the specific resin-coated cyan pigment in accordance with the present invention are obtained by measuring a volume-average particle diameter using the NANOTRAC particle size distribution analyzer UPA-EX150 (trade name, manufactured by Nikkiso Co., Ltd.) according to a dynamic light scattering method.

With regard to the cyan ink composition, individual components other than the foregoing components (a water-soluble polymerizable compound, and a photopolymerization initiator, a surfactant, a water-soluble organic solvent, and additional components which may optionally be used) and preferred ranges thereof, and the preferred range of the cyan ink composition (including production method) are the same as those of the aforementioned yellow ink composition.

<Treatment Liquid>

The ink set of the present invention includes a treatment liquid that contains an aggregating agent that aggregates components contained in the ink composition.

The treatment liquid includes at least one aggregating agent that is capable of forming an aggregate when being brought into contact with the aforementioned ink composition, and optionally may further include one or more additional components.

The aggregating agent is capable of aggregating (fixing) components contained in the ink composition when being brought into contact with the ink composition on a recording medium. The aggregating agent may, for example, function as a fixing agent. For instance, when the treatment liquid is applied onto a recording medium (preferably a coating paper), and the ink composition is further applied on the recording medium on which the aggregating agent exists, the ink composition is brought into contact with the aggregating agent and components in the ink composition are allowed to aggregate and fixed on the recording medium.

Examples of the aggregating agent include acidic compounds, polyvalent metal salts, and cationic polymers. Among these, from the viewpoint of aggregation of the ink composition components, an acidic compound is preferable. One kind of the aggregating agents may be used alone or two or more kinds thereof may be used in combination.

—Acidic Compound—

Preferred examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives thereof.

In particular, an acidic compound having high water solubility is preferable. From the viewpoint of reacting with the ink composition components and fixing the entire ink, an acidic compound having a valence of three or less is preferable. An acidic compound having a valence of two or three is particularly preferable.

One kind of the acidic compounds may be used alone or two or more kinds thereof may be used in combination.

When the treatment liquid contains an acidic compound, the pH (25° C.) of the treatment liquid is preferably in a range of from 0.1 to 6.8, more preferably from 0.5 to 6.0, and still more preferably from 0.8 to 5.0.

The content of the acidic compound is preferably 40% by mass or less based on the total mass of the treatment liquid, more preferably from 15% by mass to 40% by mass and even more preferably from 15% by mass to 35% by mass. When the content of the acidic compound is 40% by mass or less, the components in the ink composition may be more efficiently fixed.

The treatment liquid preferably contains at least one selected from the group consisting of water and water-soluble organic solvents, in addition to the aggregating agent. Details of the water-soluble organic solvent are the same as those of the ink composition, and the preferred embodiment is also the same.

The treatment liquid may further contain one or more additional additives within the scope of not impairing the effect of the present invention. Examples of the additional additives include known additives such as an anti-drying agent (wetting agent), an anti-color fading agent, an emulsification stabilizer, a penetration promoting agent, an ultraviolet absorber, a preservative, an anti-mold agent, a pH-adjusting agent, a surface tension conditioner, an anti-foaming agent, a viscosity modifier, a dispersant, a dispersion stabilizer, an anti-corrosive agent, and a chelating agent.

<Image Forming Method>

In the image forming method in accordance with the present invention, the aforementioned ink set in accordance with the present invention is used. The image forming method in accordance with the present invention includes a treatment liquid application process of applying the treatment liquid containing the aggregating agent for aggregating components in the ink compositions onto a recording medium, a first ink application process of applying a first ink composition selected from the ink set onto the recording medium onto which the treatment liquid has been applied in the treatment liquid application process, by an inkjet method, a second ink application process of applying a second ink composition selected from the ink set onto the first ink composition applied in the first ink application process, by an inkjet method, and a curing process of curing the ink compositions by irradiating active energy radiation on the recording medium onto which the ink compositions have been applied. The image forming method in accordance with the present invention may optionally include one or more additional processes.

In the image forming method in accordance with the present invention, the first ink composition is applied onto the treatment liquid applied to the recording medium, by the treatment liquid application process and the first ink application step. Next, the second ink composition is applied onto the first ink composition by the second ink application step.

Here, since the ink first ink composition is configured to have excellent aggregation property, the phenomenon of incorporation of at least a portion of the second ink composition into the first ink composition may be suppressed, and further, deterioration of color formation of the second ink composition may be suppressed. In the curing process, active energy radiation is irradiated in a state where the above-mentioned phenomenon is suppressed, to cure the first ink composition and the second ink composition applied on the first ink composition.

As described above, in the image forming method in accordance with the present invention, since curing is carried out in a state where a occurrence of phenomenon in which the first ink composition is disposed on a part of the second ink composition is suppressed, when a red, green or blue image is formed by superposing any two colors selected from a yellow ink composition, a magenta ink composition and a cyan ink composition, color reproducibility of the red, green or blue image may be improved.

<Treatment Liquid Application Process>

In the treatment liquid application process, the treatment liquid is applied onto a recording medium.

In the present invention, by performing the treatment liquid application process before the ink application processes, the speed of inkjet recording can be increased, and an image with high image density or resolution can be obtained even when the recording is performed at high speed.

The treatment liquid may be applied by a known method such as a coating method, an inkjet method or a dipping method. The coating method may be performed in accordance with a known coating method using a bar coater, an extrusion die coater, an air doctor coater, a blade coater, a rod coater, a knife coater, a squeeze coater, a reverse roll coater, or the like. Details of the inkjet method are described below.

The application amount of the treatment liquid is not particularly limited as long as it is sufficient to aggregate the ink composition, but the application amount of the treatment liquid may be preferably such that the aggregating agent is applied in an amount of 0.1 g/m$^2$ or more. In particular, the application amount of the aggregating agent is preferably in a range of from 0.1 g/m$^2$ to 1.0 g/m$^2$ and more preferably from 0.2 g/m$^2$ to 0.8 g/m$^2$. When the application amount of the aggregating agent is 0.1 g/m$^2$ or more, favorable aggregation of the ink composition may proceed. It is preferable that the application amount of the aggregating agent is 1.0 g/m$^2$ or less from the viewpoint of avoiding excessively high glossiness.

In the present invention, preferably, a heat-drying process, in which the treatment liquid applied on a recording medium is dried by heating, is further performed after the application of the treatment liquid on the recording medium and before the application of the ink composition. By drying the treatment liquid by heating in advance before the ink application step, favorable coloring properties of ink such as suppressing of bleeding can be achieved, and a visible image with favorable color density and tone can be recorded.

The heat-drying may be performed with a known heating device such as a heater, an air-blow device that uses an air-blow function of a dryer or the like, or a device in which these devices are combined. For instance, a method of applying heat with a heater or the like from a side of a recording medium opposite to a side onto which the treatment liquid is applied; a method of applying warm or hot air to a side of a recording medium onto which the treatment liquid is applied; a heating method using an infrared heater; and other methods are applicable. The heating may be performed by a combination of two or more of these methods.

<First Ink Application Process>

In the first ink application process, the first ink composition selected from the aforementioned ink set is applied onto the recording medium onto which the treatment liquid has been applied in the treatment liquid application process, by means of an inkjet method.

Through this process, the treatment liquid is brought into contact with the first ink composition, components in the first ink composition are aggregated, and therefore an image formed by the first ink composition is fixed on the recording medium.

The inkjet method is not particularly limited and may be any known method such as a charge-control method in which an ink is jetted by an electrostatic attraction force, a drop-on-demand method (pressure-pulse method) in which a pressure of oscillation of a piezo element is utilized, an acoustic inkjet process in which an ink is jetted by radiation pressure generated by irradiation of ink with acoustic beams that have been converted from electrical signals, and a thermal inkjet (BUBBLE JET (registered trade mark)) method in which an ink is jetted by a pressure generated by formation of bubbles caused by heating of the ink. The scope of the inkjet process may include a method in which a large number of small-volume droplets of an ink having a low density, which is called a photo ink, are jetted, a method in which plural inks with substantially the same hue but different densities are used to improve image quality, and a method in which a colorless and transparent ink is used.

An inkjet head that is used in the inkjet method may employ an on-demand system or a continuous system. Specific examples of a jetting system include: an electrical to mechanical converting system (for instance, a single cavity type, a double cavity type, a bender type, a piston type, a share mode type, a shared wall type, and the like); an electrical to thermal converting system (for instance, a thermal inkjet type, a "BUBBLE JET" (registered trade mark) type, and the like; an electrostatic attraction system (for instance, an electric field control type, a slit jet type, and the like); and a discharge system (for instance, a spark jet type and the like). Any of the above jetting systems may be used.

The ink nozzle or the like used for recording by the inkjet process is not particularly limited and may be appropriately selected in accordance with purposes.

Examples of the inkjet process include (i) a shuttle mode in which recording is performed while a short serial head having a small length is moved in the width direction of a recording medium in a scanning manner, and (ii) a line mode in which a line head having recording devices that are aligned correspondingly to the entire length of one side of a recording medium is used. In the line mode, image recording can be performed over the whole of one surface of a recording medium by moving the recording medium in a direction orthogonal to the disposal direction along which the recording devices are aligned, and a conveyance system such as a carriage that moves the short head in a scanning manner is not required. Since complicated scan-movement control of the movement of the carriage and the recording medium is not required and only the recording medium is moved, a faster recording speed can be achieved as compared to the shuttle mode. The image forming method in accordance with the present invention may be applied to both of these modes, but when the inkjet recording method in accordance with the present invention is applied to a line mode, in which dummy jetting is not generally conducted, the effects in improvement of jetting accuracy and the abrasion resistance of an image are significant.

The amount of ink droplets jetted from the inkjet head is preferably in a range of from 0.5 pL (picoliter) to 6 pL, more preferably from 1 pL to 5 pL, and even more preferably from 2 pL to 4 pL, from the viewpoint of attaining a high-resolution image.

<Second Ink Application Process>

In the second ink application process, the second ink composition selected from the aforementioned ink set is applied onto the first ink composition applied in the first ink application process, by means of an inkjet process.

In this process, an image of secondary color (red, blue or green) is formed through the application of the second ink composition on the first ink composition.

The period from the application of the first ink composition in the first ink application process to the application of the second ink composition in the second ink application step is preferably short from the viewpoint of image formation at high speed.

In the present invention, since the incorporation of at least a portion of the second ink composition into the first ink composition may be suppressed, the period from the application of the first ink composition in the first ink application process to the application of the second ink composition in the second ink application step may be set to, for example, 200 msec or less (preferably 150 msec or less).

The preferred embodiment of an inkjet process in the second ink application step is the same as that of the first ink application step.

<Heat-Drying Process>

The image forming method in accordance with the present invention preferably includes, after the second ink application process and before the curing process, a heat-drying process of heating an ink image formed by the application of the ink compositions to thereby remove at least a portion of a solvent in the ink composition(s). By performing the heat-drying treatment, an image with superior adhesiveness and rubbing-off resistance can be formed by the curing step performed thereafter.

The heating method is not particularly limited, and preferable examples thereof include non-contact type drying methods such as a method of heating by a heat-generating member such as a nichrome wire heater, a method of blowing warm or hot air, and a method of heating by a halogen lamp, an infrared lamp or the like.

<Curing Process>

In the curing process, the ink composition (the first ink composition and the second ink composition) are cured by irradiation of active energy radiation on a recording medium onto which the ink compositions have been applied.

Here, examples of the active energy radiation to be used include α rays, γ rays, electron beams, X-rays, ultraviolet rays, visible light, and infrared light.

In the curing step, an ink image formed by the application of the ink compositions is irradiated with, for example, ultraviolet rays from an ultraviolet irradiating lamp. In this way, a monomer component (water-soluble polymerizable compound) in the image can be reliably cured. At this time, an ultraviolet irradiating lamp is disposed to face the recording surface of a recording medium, and the entire recording surface is irradiated to cure the entire image. A light source for irradiation of active energy radiation is not limited to an ultraviolet irradiating lamp, and may adopt a halogen lamp, a high-pressure mercury lamp, a laser, an LED, an electron-beam irradiation device, or the like.

The curing process may be performed before or after the heat-drying process, as long as it is performed after the second ink application process. The curing process may be performed both before and after the heat-drying process.

The irradiation condition of active energy radiation is not particularly limited as long as a water-soluble polymerizable compound can be cured by polymerization. The wavelength of active energy radiation may be, for example, preferably in a range of from 200 to 600 nm, more preferably from 300 to 450 nm, and still more preferably from 350 to 420 nm.

The output of active energy radiation is preferably in a range of 5000 mJ/cm$^2$ or less, more preferably 10 to 4000 mJ/cm$^2$, and even more preferably 20 to 3000 mJ/cm$^2$.

—Recording Medium—

In the image forming method of the present invention, an image is recorded on a recording medium.

The recording medium is not particularly limited and may be a cellulose-based general printing paper, such as so-called high-quality paper, coated paper, or art paper, which is used for general offset printing and the like. When image recording is performed on the cellulose-based general printing paper by a general inkjet method using an aqueous ink, absorption and drying of the ink is relatively slow, migration of a coloring material easily occurs after ink application, and image quality tends to be lowered. In contrast, according to the image forming method using the ink set of the present invention, a high-quality image recording having excellent color density and hue can be achieved while suppressing the migration of the coloring material.

The recording medium may be a commercially-available product, and examples thereof include high-quality paper (A) such as OK PRINCE HIGH-QUALITY (trade name) manufactured by Oji Paper Co., Ltd., SHIRAOI (trade name) manufactured by Nippon Paper Industries Co., Ltd. and NEW NPI HIGH-QUALITY (trade name) manufactured by Nippon Paper Industries Co., Ltd.; lightly coated paper such as OK EVER LIGHT COAT (trade name) manufactured by Oji Paper Co., Ltd. and AURORA S (trade name) manufactured by Nippon Paper Industries Co., Ltd.; lightweight coated paper (A3) such as OK COAT L (trade name) manufactured by Oji Paper Co., Ltd. and AURORA L (trade name) manufactured by Nippon Paper Industries Co., Ltd.; coated paper (A2, B2) such as OK TOPCOAT+(trade name) manufactured by Oji Paper Co., Ltd. and AURORA COAT (trade name) manufactured by Nippon Paper Industries Co., Ltd.; and art paper (A1) such as OK KINFUJI+(trade name) manufactured by Oji Paper Co., Ltd. and TOKUBISHI ART (trade name) manufactured by Mitsubishi Papers Mills Ltd. Various types of photo paper for inkjet recording may also be used.

Among the above, from the viewpoint of obtaining a high-quality image having better color density and hue in which the effect of suppressing migration of a coloring material is high, the recording medium preferably has a water absorption coefficient Ka of 0.05 to 0.5 mL/m$^2$·ms$^{1/2}$, more preferably 0.1 to 0.4 mL/m$^2$·ms$^{1/2}$, and still more preferably 0.2 to 0.3 mL/m$^2$·ms$^{1/2}$.

The water absorption coefficient Ka has the same meaning as that described in JAPAN TAPPI pulp and paper test method No. 51:2000 (published by Japan Technical Association of the Pulp and Paper Industry), the disclosure of which is incorporated by reference herein. Specifically, the water absorption coefficient Ka is calculated from the difference in the amount of transferred water between at a contact time of 100 ms and at a contact time of 900 ms measured with an automatic scanning liquid absorptometer KM500WIN (trade name, manufactured by Kumagai Riki Kogyo Co., Ltd.).

Among the recording media, a so-called coated paper for use in general offset printing or the like is preferable. The coated paper is obtained by applying a coating material to the surface of non-surface-treated cellulose-based general high-quality paper, neutralized paper or the like to form a coating layer thereon. In usual aqueous inkjet image forming, the coated paper is likely to cause problems in quality, such as image glossiness or rubbing-off resistance. However, in the ink-jet recording method of the invention, uneven glossiness can be reduced, and an image having favorable glossiness and rubbing-off resistance can be obtained. In particular, coated paper having a base paper and a coating layer containing kaolin and/or calcium bicarbonate is preferably used. More specifically, art paper, coated paper, lightweight coated paper, or lightly coated paper is more preferable.

<Inkjet Recording Apparatus>

Next, an example of an inkjet recording apparatus favorably used for the image forming method of the present invention is explained in detail with reference to FIG. 1. FIG. 1 is a schematic diagram showing an example of a structure of the entire inkjet recording apparatus.

As shown in FIG. 1, the inkjet recording apparatus includes: a treatment liquid application part 12, having a treatment liquid jetting head 12S that jets the treatment liquid; a treatment liquid drying zone 13, having a heating means (not shown) that dries the applied treatment liquid; an ink jetting part 14 that jets various ink compositions; and an ink drying zone 15 at which the jetted ink composition is dried, in this order in the conveyance direction of the recording medium (the direction of the arrow shown in the FIGURE). Further, an ultraviolet irradiating part 16 having an ultraviolet irradiating lamp 16S is provided at a downstream side of the ink drying zone 15 in the conveyance direction of the recording medium.

The recording medium that has been supplied to the inkjet recording apparatus is conveyed by conveyance rollers from a paper supply part to the treatment liquid application part 12, then to the treatment liquid drying zone 13, then to the ink jetting part 14, then to the ink drying zone 15, and then to the ultraviolet irradiating part 16, and then is collected in the accumulation manner in a collection and accumulation part. The paper supply part supplies sheets of the recording medium from a case in which the recording media are loaded. The conveyance of the recording medium may be conducted by a method using conveyance rollers, or methods other than the method using conveyance rollers, and examples of the other methods include a drum conveyance method using a drum-shaped member, a belt conveyance method, or a stage conveyance method using a stage.

Among the plural conveyance rollers provided in the inkjet recording apparatus, at least one roller may be a drive roller to which the force generated by a motor (not shown) is transmitted. By rotating the drive roller at a constant rate using the motor, the recording medium is conveyed in a predetermined direction, by a predetermined conveyance amount.

The treatment liquid application part 12 includes a treatment liquid jetting head 12S, which is connected to a storage tank in which the treatment liquid is stored. The treatment liquid jetting head 12S jets the treatment liquid from jetting nozzles disposed to face the recording surface of the recording medium so that droplets of the treatment liquid can be applied onto the recording medium. The method used in the treatment liquid application part 12 is not limited to a method of jetting from a head in the form of a nozzle, and may be a coating method using a coating roller. According to the coating method, the treatment liquid may be readily applied to almost the entire surface of the recording medium, including an image portion on which ink droplets are to be applied by the ink jetting part 14 provided at the downstream side. In order to uniformize the thickness of the treatment liquid applied onto the recording medium, a method using an air-knife, or a method of providing a member having an acute angle to provide a gap between the member and the recording medium that corresponds to the predetermined amount of treatment liquid, may be used.

The treatment liquid drying zone 13 is positioned at a downstream side of the treatment liquid application part 12 in the conveyance direction of the recording medium. The treatment liquid drying zone 13 may include a known heating means such as a heater; an air blowing means such as a drier; or a means in which these are combined. The heating means may utilize, for example, a method in which a heat generating member such as a heater is disposed on the side opposite to a treatment liquid application surface side of the recording medium (for example, below a conveying mechanism on which a recording medium is placed and conveyed in a case of automatically conveying the recording medium); a method in which warm air or a hot air is applied to the treatment liquid application surface of the recording medium; or a heating method of using an infrared heater. These methods may be used in a combination of two or more thereof.

Since the surface temperature of the recording medium may vary depending on the type (material, thickness or the like) of the recording medium, the environmental temperature and the like, it is preferable to provide a measurement part that measures the surface temperature of the recording medium and a control mechanism for feeding back the value of the thus-measured surface temperature of the recording medium to the heating control part, thereby regulating the temperature when forming a treatment liquid application layer. The measurement part for measuring the surface temperature of the recording medium is preferably a contact-type or non-contact type thermometer.

The solvent may be removed using a solvent-removing roller or the like. Alternatively, a method in which excess solvent is removed from the recording medium by an air knife is also applicable.

The ink jetting part 14 is positioned at a downstream side of the treatment liquid drying zone 13 in the conveyance direction of the recording medium.

The ink jetting part 14 includes ink jetting heads 30A, 30B, 30C and 30D, which are connected to ink reservoirs that store ink compositions of black (K), cyan (C), magenta (M) and yellow (Y), respectively (the corresponding relationship between the ink jetting heads and the ink composition are described below). Each ink reservoir (not shown) stores an ink composition of a corresponding color, and supplies in accordance with necessity the ink composition to the corresponding head among ink jetting heads 30A, 30B, 30C and 30D, when image recording is performed.

The corresponding relationship between the ink jetting heads and the ink compositions is not particularly limited, as long as a reservoir that stores a second ink composition is connected to an ink jetting head in the conveyance direction at a downstream side of an ink jetting head connected to a reservoir that stores a first ink composition.

From the viewpoint of more effectively exhibiting the effect of color reproducibility of a secondary color in accordance with the present invention, a reservoir for storing the first ink composition and a reservoir for storing the second ink composition are preferably connected to adjacent two ink jetting heads. Specific examples of the preferred embodiment include (1) an embodiment in which a reservoir for storing the first ink composition is connected to ink jetting head 30A and a reservoir for storing the second ink composition is connected to ink jetting head 30B, (2) an embodiment in which a reservoir for storing the first ink composition is connected to ink jetting head 30B and a reservoir for storing the second ink composition is connected to ink jetting head 30C, and (3) an embodiment in which a reservoir for storing the first ink composition is connected to ink jetting head 30C and a reservoir for storing the second ink composition is connected to ink jetting head 30D.

Further, the ink jetting part 14 may be provided with additional ink jetting heads at least one site of an upstream side of ink jetting head 30A, a downstream side of ink jetting head 30D, between ink jetting head 30A and ink jetting head 30B, between ink jetting head 30B and ink jetting head 30C, and between ink jetting head 30C and ink jetting head 30D. As described above, in addition to ink jetting part 14 having 4 ink jetting heads shown in FIG. 1, an ink jetting part having 5 or more ink jetting heads disposed in the conveyance direction may be used as the ink jetting part.

Also in this case, a reservoir that stores a second ink composition is connected to an ink jetting head in the conveyance direction at a downstream side of an ink jetting head connected to a reservoir that stores a first ink composition.

Ink jetting heads 30A, 30B, 30C and 30D jet inks according to the images to be formed, through jetting nozzles that are positioned so as to face the recording surface of the recording medium. In this way, inks of the respective colors are applied to the recording surface of the recording medium to record a color image.

Treatment liquid jetting head 12S and ink jetting heads 30A, 30B, 30C and 30D are each in the form of full-line head in which a number of jetting ports (nozzles) are aligned along the maximum recording width of the image to be recorded on the recording medium. In this form, image recording on a recording medium can be carried out at higher speed compared to serial-type recording in which recording is carried out using a short shuttle head that reciprocates in the width direction of the recording medium (in a direction on the plane of the recording medium that is perpendicular to the conveyance direction of the recording medium) while performing scanning. In the present invention, either of the serial-type recording method or a recording method capable of recording at relatively high speed, such as a single-pass system which is capable of recording by jetting in the main scanning direction in single-pass manner where a line is formed at a single round of scanning, may be employed. In the image recording method of the present invention, a high-quality image having high reproducibility may be obtained even in the single-pass system.

Here, the treatment liquid jetting head 12S and ink jetting heads 30A, 30B, 30C and 30D each have the same structure.

The application amount of the treatment liquid and the application amount of the ink composition are preferably regulated in accordance with necessity. For example, the amount of the treatment liquid may be changed according to the type of the recording medium, in order to adjust the properties such as viscoelasticity of an aggregate formed when mixing the treatment liquid and the ink composition.

An ink drying zone 15 is positioned at a downstream side of an ink jetting part 14 in the conveyance direction of the recording medium. The ink drying zone 15 may have a structure similar to that of treatment liquid drying zone 13.

The ultraviolet irradiating part 16 is disposed at a downstream side of ink drying zone 15 in the conveyance direction of the recording medium. The ultraviolet irradiating part 16 is configured to irradiate ultraviolet rays by means of an ultraviolet irradiating lamp 16S provided in the ultraviolet irradiating part 16 and polymerize and cure monomer components present in an image after drying of the image. The ultraviolet irradiating lamp 16S is configured to irradiate the entire recording surface by means of a lamp disposed to face the recording surface of the recording medium and perform curing of the entire image. Further, the ultraviolet irradiating part 16 may adopt a halogen lamp, a high-pressure mercury lamp, a laser, an LED, an electron beam irradiating apparatus or the like, in place of the ultraviolet irradiating lamp 16S.

The ultraviolet irradiating lamp 16S may be disposed before or after the ink drying zone 15.

The inkjet recording apparatus may further include a heating means at the conveyance path from the feed part 20 to the collection and accumulation part 30, in order to conduct a heat treatment on the recording medium. For example, by providing a heating means at a desired position, such as at an upstream side of the treatment liquid drying zone 13 or between ink jetting part 14 and ink drying zone 15, the temperature of the recording medium can be raised to a desired temperature, so that drying and fixing are performed effectively.

EXAMPLES

The present invention is further described in detail with reference to the following examples, but it should be construed that the invention is in no way limited to those examples. Unless otherwise particularly mentioned, "part(s)" and "%" are based on mass.

Synthesis Example

Synthesis of Water-Soluble Resin Dispersant P-1

The water-soluble resin dispersant P-1 was synthesized according to the following procedure.

A monomer feed composition was prepared by mixing methacrylic acid (172 parts), benzyl methacrylate (828 parts), and isopropanol (375 parts). An initiator feed composition was prepared by mixing 2,2-azobis(2-methylbutyronitrile) (22.05 parts) and isopropanol (187.5 parts).

A mixture of the monomer feed composition and the initiator feed composition was added dropwise over 2 hours to isopropanol (187.5 parts) heated to 80° C. under a nitrogen atmosphere. After dropwise addition was completed, the mixture was maintained at 80° C. for another 4 hours, and then cooled to 25° C.

After being cooled, the solvent was removed under reduced pressure to give a water-soluble resin dispersant P-1 (water-soluble resin) having a weight-average molecular weight of about 30000 and an acid value of 112 mgKOH/g.

<<Preparation of Magenta Ink Composition (M1)>>
<Preparation of Magenta Pigment Dispersion A>

The above-obtained water-soluble resin dispersant (150 parts) was neutralized with a potassium hydroxide aqueous solution to prepare a water-soluble resin dispersant aqueous solution such that the pH after neutralization was 9, and the water-soluble resin dispersant concentration was 25% by mass.

The resulting water-soluble resin dispersant aqueous solution (58.3 parts), Pigment Red 122 (magenta pigment) (48.6 parts), water (144 parts), and dipropylene glycol (75 parts) were mixed and dispersed in a bead mill (zirconia beads having a diameter of 0.1 mmϕ) for 4 hours to give a dispersion N1 (uncrosslinked dispersion) of resin-coated magenta pigment particles having a pigment concentration of 15%.

DENACOL EX-321 (trade name, a crosslinking agent manufactured by Nagase Chemtex Corporation) (0.4 parts) was added to the dispersion N1 (136 parts), followed by reaction at 50° C. for 6.5 hours and the mixture was cooled to 25° C. to give a crosslinked dispersion. The resulting crosslinked dispersion was subjected to ultrafiltration using an ultrafiltration filter (fractional molecular weight of 50,000, Q0500076E ULTRAFILTER, trade name, manufactured by ADVANTEC), followed by purification, and was prepared to be a pigment concentration of 15% by mass, thus giving a magenta pigment dispersion A.

<Preparation of Magenta Ink Composition (M1)>

The following composition was mixed, filtered through a glass filter (GS-25, trade name, manufactured by ADVANTEC), and filtered through a filter (PVDF membrane, pore diameter of 5 µm, manufactured by Millipore) to give a magenta ink composition (M1).

Composition of Magenta Ink Composition (M1)
Magenta pigment dispersion A: 35.3 parts
Polymerizable compound 2 given below: 21 parts
OLFINE E1010 (trade name, surfactant, manufactured by Nissin Chemical Industry Co., Ltd.): 1 part
IRGACURE 2959 (trade name, photopolymerization initiator, manufactured by BASF Japan): 3 parts
Balance of ion-exchange water to make a total of 100 parts Here, polymerizable compound 2 was a compound which was synthesized as follows and has a structure given below.

—Synthesis of Polymerizable Compound 2—

To a 1 L three-necked flask equipped with an agitator, 40.0 g (182 mmol) of 4,7,10-trioxa-1,13-tridecanediamine, 37.8 g (450 mmol) of sodium bicarbonate, 100 g of water, and 300 g of tetrahydrofuran were charged and on an ice bath, 35.2 g (389 mmol) of acrylic acid chloride was added dropwise thereto over 20 minutes. After the dropwise addition was completed, the mixture was stirred at room temperature for 5 hours, and tetrahydrofuran was removed from the resulting reaction mixture by evaporation under reduced pressure. Then, the aqueous layer was extracted 4 times with 200 ml of ethyl acetate, and the resulting organic layer was dried over magnesium sulfate and filtered, followed by removal of the solvent by evaporation under reduced pressure to give 35.0 g (107 mmol, yield 59%) of a desired polymerizable compound 2 as a solid. The polymerizable compound 2 had an A value of 164.2.

Polymerizable compound 2

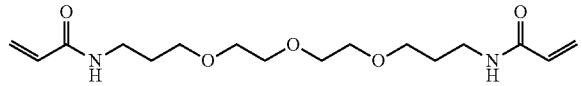

The volume-average particle diameter (secondary particles) of particles contained in the magenta ink composition (M1) is given in the column "Volume-average particle diameter [nm]" of Table 1 and Table 2. The volume-average particle diameter (secondary particles) was measured by a dynamic light scattering method using the NANOTRAC particle diameter distribution analyzer UPA-EX150 (trade name, manufactured by Nikkiso Co., Ltd.).

The content of Pigment Red 122 (magenta pigment) (unit: % by mass) based on the total amount of the magenta ink composition (M1) is given in the column "P(%)" of Table 1 and Table 2.

The mass ratio of the crosslinked water-soluble resin to the magenta pigment [mass of crosslinked water-soluble resin/mass of Pigment Red 122 (magenta pigment)] in the magenta ink composition (M1) is given in the column "D/P" of Table 1 and Table 2.

The acid value [mgKOH/g] of the post-crosslinking water-soluble resin dispersant P-1 (water-soluble resin) in the magenta ink composition (M1) is given in the column "Post-crosslinking acid value [mgKOH/g]" of Table 1 and Table 2.

<<Preparation of Magenta Ink Composition (M2 to M10, and M12)>>

Each of magenta pigment dispersions for magenta ink compositions M2 to M10 and M12 was prepared by a method similar to the method in the preparation of the magenta pigment dispersion A. However, the amounts of a dispersant P-1, a potassium hydroxide aqueous solution and DENACOL EX-321 and the dispersion time were changed as appropriate so as to provide the mass ratio [mass of crosslinked water-soluble resin/mass of magenta pigment], post-crosslinking acid value, and volume-average particle diameter given in Table 1 and Table 2 (with regard to each of the magenta pigment dispersions for the magenta ink compositions M10 and M12, DENACOL EX-321 was not used). Then, each of the magenta ink compositions (M2 to M10, M12) was prepared in substantially the same manner as in the magenta ink composition (M1), except that the magenta pigment dispersions for the magenta ink compositions M2 to M10 and M12 were respectively used, and that in each of magenta ink compositions M2 to M10 and M12, the amount of the magenta pigment dispersions was changed so as to attain the content of the magenta pigment given in Table 1 and Table 2.

With regard to the magenta ink compositions M10 and M12, the magenta pigment dispersion was not subjected to crosslinking, and the uncrosslinked dispersion was subjected to ultrafiltration to prepare an ink composition.

<<Preparation of Magenta Ink Composition (M11)>>

Magenta ink composition M11 was prepared in the same manner as in the magenta ink composition M1, except that beads used in a bead mill were changed to zirconia beads having a diameter of 0.05 mmφ, and the dispersion time was adjusted until a desired volume-average particle diameter was achieved.

<<Preparation of Yellow Ink Composition (Y1)>>
<Preparation of Yellow Pigment Dispersion B>

The above-obtained water-soluble resin dispersant P-1 (150 parts) was neutralized with a potassium hydroxide aqueous solution to prepare a water-soluble resin dispersant aqueous solution such that the pH after neutralization was 9, and the water-soluble resin dispersant concentration was 25% by mass.

The resulting water-soluble resin dispersant aqueous solution (116.6 parts), Pigment Yellow 74 (yellow pigment) (48.6 parts), water (128.8 parts), and dipropylene glycol (30 parts) were mixed and dispersed in a bead mill (zirconia beads having a diameter of 0.1 mmφ) until a desired volume-average particle diameter was obtained, thus giving a dispersion N2 (uncrosslinked dispersion) of resin-coated yellow pigment particles having a pigment concentration of 15%.

To the dispersion N2 (136 parts), DENACOL EX-321 (a crosslinking agent manufactured by Nagase Chemtex Corporation) (0.9 parts), followed by reaction at 50° C. for 6.5 hours and the mixture was cooled to 25° C. to give a crosslinked dispersion. The resulting crosslinked dispersion was subjected to ultrafiltration using an ultrafiltration filter (fractional molecular weight of 50,000, Q0500076E ULTRAFILTER, trade name, manufactured by ADVANTEC), followed by purification, and then, the pigment concentration was adjusted to 15% by mass, thus giving a yellow pigment dispersion B.

<Preparation of Yellow Ink Composition (Y1)>

The following composition was mixed, filtered through a glass filter (GS-25, trade name, manufactured by ADVAN- TEC), and then filtered through a filter (PVDF membrane, pore diameter of 5 μm, manufactured by Millipore) to give a yellow ink composition (Y1).

Composition of Yellow Ink Composition (Y1)
Yellow pigment dispersion B: 25.3 parts
Polymerizable compound 2 given above: 21 parts
OLFINE E1010 (trade name, surfactant, manufactured by Nissin Chemical Industry Co., Ltd.): 1 part
IRGACURE 2959 (trade name, photopolymerization initiator, manufactured by BASF Japan): 3 parts
Balance of ion-exchange water to make a total of 100 parts The volume-average particle diameter (secondary particles) of particles contained in the yellow ink composition (Y1) is given in the column "Volume-average particle diameter [nm]" of Table 2 and Table 3. The volume-average particle diameter (secondary particles) was measured by a dynamic light scattering method using the NANOTRAC particle size distribution analyzer UPA-EX150 (trade name, manufactured by Nikkiso Co., Ltd.).

The content of Pigment Yellow 74 (yellow pigment) (unit: % by mass) based on the total amount of the yellow ink composition (Y1) is given in the column "P(%)" of Table 2 and Table 3.

The mass ratio of the crosslinked water-soluble resin to the yellow pigment [mass of crosslinked water-soluble resin/mass of Pigment Yellow 74 (yellow pigment)] in the yellow ink composition (Y1) is given in the column "D/P" of Table 2 and Table 3.

The acid value [mgKOH/g] of the post-crosslinking water-soluble resin dispersant P-1 (water-soluble resin) in the yellow ink composition (Y1) is given in the column "Post-crosslinking acid value [mgKOH/g]" of Table 2 and Table 3.

<<Preparation of Yellow Ink Composition (Y2 to Y9)>>

Each of yellow pigment dispersions for yellow ink compositions Y2 to Y9 was prepared by a method similar to the method in the preparation the yellow pigment dispersion B. However, the amounts of a dispersant P-1, a potassium hydroxide aqueous solution and DENACOL EX-321 and the dispersion time were changed as appropriate so as provide the mass ratio [mass of crosslinked water-soluble resin/mass of yellow pigment], post-crosslinking acid value, and volume-average particle diameter given in Table 2 and Table 3 (with regard to each of the yellow pigment dispersions for the yellow ink compositions Y2, Y4, Y6 and Y9, DENACOL EX-321 was not used). Then, each of the yellow ink compositions (Y2 to Y9) was prepared in substantially the same manner as in the yellow ink composition (Y1), except that the yellow pigment dispersions for the yellow ink compositions Y2 to Y9 were respectively used, and that in each of the yellow ink compositions Y2 to Y9, the amount of the yellow pigment dispersion was changed so as to attain the content of the yellow pigment given in Table 2 and Table 3.

With regard to the yellow ink compositions Y2, Y4, Y6 and Y9, the yellow pigment dispersion was not subjected to crosslinking, and the uncrosslinked dispersion was subjected to ultrafiltration to prepare an ink composition.

<<Preparation of Cyan Ink Composition (C1)>>
<Preparation of Cyan Pigment Dispersion C>

The above-obtained water-soluble resin dispersant P-1 (150 parts) was neutralized with a potassium hydroxide aqueous solution to prepare a water-soluble resin dispersant aqueous solution such that the pH after neutralization was 9, and the water-soluble resin dispersant concentration was 25% by mass.

The resulting water-soluble resin dispersant aqueous solution (97.2 parts), Pigment Blue 15:3 (cyan pigment) (48.6 parts), water (78.2 parts), and dipropylene glycol (100 parts) were mixed and dispersed in a bead mill (zirconia beads having a diameter of 0.1 mmφ) until a desired volume-average particle diameter was obtained, thus giving a dispersion N3 (uncrosslinked dispersion) of resin-coated cyan pigment particles having a pigment concentration of 15%.

To the dispersion N3 (136 parts), DENACOL EX-321 (trade name, a crosslinking agent manufactured by Nagase Chemtex Corporation) (1 part) was added, followed by reaction at 50° C. for 6.5 hours and the mixture was cooled to 25° C. to give a crosslinked dispersion. The resulting crosslinked dispersion was subjected to ultrafiltration using an ultrafiltration filter (fractional molecular weight of 50,000, Q0500076E ULTRAFILTER, trade name, manufactured by ADVANTEC), followed by purification, and the pigment concentration was adjusted to 15% by mass, thus giving a cyan pigment dispersion C.

<Preparation of Cyan Ink Composition (C1)>

The following composition was mixed, filtered through a glass filter (GS-25, trade name, manufactured by ADVANTEC), and filtered through a filter (PVDF membrane, pore diameter of 5 μm, manufactured by Millipore) to give a cyan ink composition (C1).

Composition of Cyan Ink Composition (C1)
Cyan pigment dispersion C: 16 parts
Polymerizable compound 2 given above: 21 parts
OLFINE E1010 (trade name, surfactant, manufactured by Nissin Chemical Industry Co., Ltd.): 1 part
IRGACURE 2959 (trade name, photopolymerization initiator, manufactured by BASF Japan): 3 parts
Balance of ion-exchange water to make a total of 100 parts The volume-average particle diameter (secondary particles) of particles contained in the cyan ink composition (C1) is given in the column "Volume-average particle diameter [nm]" of Table 1 and Table 3. The volume-average particle diameter (secondary particles) was measured by a dynamic light scattering method using the NANOTRAC particle diameter distribution analyzer UPA-EX150 (trade name, manufactured by Nikkiso Co., Ltd.).

The content of Pigment BLUE 15:3 (cyan pigment) (unit: % by mass) based on the total amount of the cyan ink composition (C1) is given in the column "P(%)" of Table 1 and Table 3.

The mass ratio of the crosslinked water-soluble resin to the cyan pigment [mass of crosslinked water-soluble resin/mass of Pigment BLUE 15:3 (cyan pigment)] in the cyan ink composition (C1) is given in the column "D/P" of Table 1 and Table 3.

The acid value [mgKOH/g] of the post-crosslinking water-soluble resin dispersant (water-soluble resin) in the cyan ink composition (C1) is given in the column "Post-crosslinking acid value [mgKOH/g]" of Table 1 and Table 3.

<<Preparation of Cyan Ink Composition (C2 to C17)>>

Each of cyan pigment dispersions for cyan ink compositions C2 to C17 was prepared by a method similar to the method in the preparation the cyan pigment dispersion C. However, the amounts of a dispersant P-1, a potassium hydroxide aqueous solution and DENACOL EX-321 and the dispersion time were changed as appropriate so as provide the mass ratio [mass of crosslinked water-soluble resin/mass of cyan pigment], post-crosslinking acid value, and volume-average particle diameter given in Table 1 and Table 3 (with regard to the each of the cyan pigment dispersions for the cyan ink compositions C6, C7, and C13, DENACOL EX-321 was not used). Then, each of the cyan ink compositions (C2 to C17) was prepared in substantially the same manner as in the cyan ink composition (C1), except that the cyan pigment dispersions for the cyan ink compositions C2 to C17 were respectively used, and that in each of the cyan ink compositions C2 to C17, the amount of the cyan pigment dispersion was changed so as to attain the content of the cyan pigment given in Table 1 and Table 3.

With regard to the cyan ink compositions C6, C7, and C13, the cyan pigment dispersion was not subjected to crosslinking, and the uncrosslinked dispersion was subjected to ultrafiltration to prepare an ink composition.

<<Preparation of Black Ink Composition (K1)>>
<Preparation of Black Dispersion K>

The above-obtained water-soluble resin dispersant P-1 (150 parts) was neutralized with a potassium hydroxide aqueous solution to prepare a water-soluble resin dispersant aqueous solution such that the pH after neutralization was 9, and the water-soluble resin dispersant concentration was 25% by mass.

The resulting water-soluble resin dispersant aqueous solution (97.2 parts), a carbon black pigment (NIPEX170-IQ, trade name, manufactured by Degussa) (48.6 parts), water (78.2 parts), and dipropylene glycol (100 parts) were mixed and dispersed in a bead mill (zirconia beads having a diameter of 0.1 mmφ) until a desired volume-average particle diameter was obtained, thus giving a dispersion N4 (uncrosslinked dispersion) of resin-coated black pigment particles having a pigment concentration of 15%.

To the dispersion N4 (136 parts), DENACOL EX-321 (a crosslinking agent manufactured by Nagase Chemtex Corporation) (1 part) was added, followed by reaction at 50° C. for 6.5 hours and the mixture was cooled to 25° C. to give a crosslinked dispersion. The resulting crosslinked dispersion was subjected to ultrafiltration using an ultrafiltration filter (fractional molecular weight of 50,000, Q0500076E ULTRAFILTER, trade name, manufactured by ADVANTEC), followed by purification, and the pigment concentration was adjusted to 15% by mass, thus giving a black pigment dispersion K.

<Preparation of Black Ink Composition (K1)>

The following composition was mixed, filtered through a glass filter (GS-25, trade name, manufactured by ADVANTEC), and filtered through a filter (PVDF membrane, pore diameter of 5 μm, manufactured by Millipore) to give a black ink composition (K1).

Composition of black ink composition (K1)
Black pigment dispersion K: 23 parts
Polymerizable compound 2 given above: 21 parts
OLFINE E1010 (surfactant, manufactured by Nissin Chemical Industry Co., Ltd.): 1 part
IRGACURE 2959 (trade name, photopolymerization initiator, manufactured by BASF Japan): 3 parts
Balance of ion-exchange water to make a total of 100 parts <<Preparation of Treatment Liquid>>

Components of the following composition were mixed to prepare a treatment liquid.

The resulting treatment liquid had a viscosity of 2.5 mPa·s, a surface tension of 40 mN/m, and a pH (25±1° C.) of 1.0.

Here, the surface tension was measured with an automatic surface tensiometer CBVP-Z (trade name, manufactured by Kyowa Interface Science Co., Ltd.), and the viscosity was measured with DV-III ULTRA CP (trade name, manufactured by Brookfield Engineering). The pH was measured with a PH METER HM-30R (trade name, manufactured by DKK-TOA Corporation).

Composition of Treatment Liquid
Malonic acid (manufactured by Wako Pure Chemical Industries, Ltd.): 25%
Diethylene glycol monomethyl ether (manufactured by Wako Pure Chemical Industries, Ltd.): 20.0%
EMULGEN P109 (trade name, nonionic surfactant, manufactured by Kao Corporation): 1.0%
Balance of ion-exchange water to make a total of 100%

Experimental Examples 101 to 116, 201 to 219, and 301 to 316

Ink Set

Individual ink sets including a combination of one of the magenta ink compositions M1 to M12, one of the yellow ink compositions Y1 to Y9, one of the cyan ink compositions C1 to C17, the black ink composition K1, and the treatment liquid were prepared.

<<Image Formation>>

Using the obtained ink sets, an image was formed by dichromatic inks (Ink 1 and Ink 2) given in Table 1 to Table 3.

Specifically, a blue image was formed using Ink 1 and Ink 2 given in Table 1 (Experimental Examples 101 to 116), a red image was formed using Ink 1 and Ink 2 given in Table 2 (Experimental Examples 201 to 219), and a green image was formed using Ink 1 and Ink 2 given in Table 3 (Experimental Examples 301 to 316).

In Table 1 to Table 3, "Ink 1" represents an ink which is applied as a first ink composition onto a recording medium, and "Ink 2" represents an ink which is applied as a second ink composition onto Ink 1.

Formation of each image was carried out as follows.

First, as shown in FIG. 1, an inkjet device was prepared which includes a treatment liquid application part 12 having a treatment liquid jetting head 12S that jets a treatment liquid, a treatment liquid drying zone 13 at which the applied treatment liquid is dried, an ink jetting part 14 that jets a variety of water-based inks, an ink drying zone 15 at which the jetted water-based ink is dried, and a UV irradiation part 16 having a UV irradiation lamp 16S that is capable of irradiating UV rays, arranged in this order in a conveyance direction (the direction of the arrow in FIG. 1) of the recording medium.

Although not shown, the treatment liquid drying zone 13 has an air blower that performs drying by supplying a dry air at a recording surface side of the recording medium and has an infrared heater at a non-recording surface side of the recording medium, and is configured to dry the treatment liquid applied on the recording medium. In the ink jetting part 14, ink jetting head 30A, ink jetting head 30B, ink jetting head 30C, and ink jetting head 30D are arranged in this order in the conveyance direction (the direction of the arrow). Each head is a 1200 dpi/10 inch wide full-line head (a driving frequency: 25 kHz, conveyance speed of recording medium: 530 mm/sec). The respective heads jet inks of respective colors in a single pass manner while moving in a main scanning direction relative to the recording medium, thereby recording an image.

The ink sets (treatment liquid, magenta ink composition, yellow ink composition, cyan ink composition, and black ink composition) were charged to storage tanks (not shown) that are each connected to the treatment liquid jetting head 12S, and ink jetting heads 30A, 30B, 30C and 30D of corresponding colors of the inkjet apparatus as shown in FIG. 1.

Specifically, the treatment liquid was charged to a storage tank that is connected to treatment liquid jetting head 12S, Ink 1 given in Table 1 to Table 3 was charged to a storage tank that is connected to ink jetting head 30A, Ink 2 given in Table 1 to Table 3 was charged to a storage tank that is connected to ink jetting head 30B, and other dichromatic inks (inks of different color other than Ink 1 and Ink 2) were charged to storage tanks that are connected to ink jetting heads 30C and 30D.

As described above, ink sets were loaded to an inkjet apparatus, and a solid image and a line image at 1200 dpi were recorded on a recording medium.

At this time, the application amount of the treatment liquid to the recording medium was set to provide a thickness of about 1.2 µm.

As the recording medium, "U-LITE" (trade name, basis weight of 84.9 g/m$^2$) manufactured by Nippon Paper Industries Co., Ltd. or TOKUBISHI ART DOUBLE-SIDED N PAPER (trade name) manufactured by Mitsubishi Papers Mills Ltd (basis weight of 104.7 g/m$^2$) were used.

In recording an image, the treatment liquid and the ink compositions were jetted at a resolution of 1200 dpi×1200 dpi, and an ink amount per droplet of 3 µL.

A line image was recorded by jetting lines of 1-dot width, lines of 2-dot width and lines of 4-dot width at 1200 dpi in the main scanning direction in a single-pass manner.

Evaluations of color reproducibility and rubbing-off resistance were carried out with a sample prepared in which the solid image of Ink 2 was formed on the solid image of Ink 1.

In the image recording, the treatment liquid was first jetted from the treatment liquid jetting head 12S on a recording medium in a single pass manner. The treatment liquid applied on the recording medium was dried in the treatment liquid drying zone 13 such that the treatment liquid applied on the recording medium passed the treatment liquid drying zone within 900 msec after the initiation of the jetting of the treatment liquid. In the treatment liquid drying zone 13, while the jetted treatment liquid was heated with an infrared heater from a side of the recording medium that was opposite to the surface on which the treatment liquid was jetted (rear face) such that the surface temperature of the jetted treatment liquid was maintained at from 40 to 45° C., the recorded surface was dried using an air blower by blowing hot air of 120° C. in a different air amount such that the predetermined drying amount was obtained.

Subsequently, in ink jetting part 14, Ink 1 was jetted on the post-drying treatment liquid from ink jetting head 30A, and Ink 2 was jetted on the jetted Ink 1 from ink jetting head 30B. At this time, the period from jetting of Ink 1 to jetting of Ink 2 was set to 140 msec, whereby an image was recorded.

In a manner similar to the drying of the treatment liquid as described above, the recorded image was dried in the ink drying zone 15 using an air blower by blowing hot air to the recording surface at a temperature of 120° C. and an air flow rate of 5 msec for 15 seconds while heating with an infrared heater from the side of the recording medium that was opposite to the surface on which the ink was jetted (rear face).

After the drying of the image, the image was cured by irradiating UV light (using a metal halide lamp, manufactured by Eye Graphics Co., Ltd., maximum irradiation wavelength: 365 nm) in the UV irradiating part 16 to have an accumulated irradiation dose of 3 J/cm$^2$.

<<Image Evaluation>>

Image evaluation for the above-formed images was carried as follows.

The evaluation results are given in Table 1 to Table 3 below.

<Image Quality (Image Forming Property)>

The image forming property was evaluated according to the following evaluation criteria, with respect to the line of 1-dot width, the line of 2-dot width, and the line of 4-dot width recorded on U-LITE as described above.

—Evaluation Criterion—

1: All lines are uniform lines.
2: The line of 1-dot width is uniform, but non-uniformity in the line width and/or break in the line, and/or ink blot are observed in some parts of the line of 2-dot width and the line of 4-dot width.
3: The line of 1-dot width is uniform, but non-uniformity in the line width and/or break in the line, and/or ink blot are observed throughout the line of 2-dot width and the line of 4-dot width.
4: Significant non-uniformity in the line width and/or break in the line, and ink blot are observed throughout the lines.

<Image Quality (Rubbing-Off Resistance)>

The sample of the solid image recorded on TOKUBISHI ART PAPER was allowed to stand for 72 hours under the conditions of 25° C. and 50% RH. Then, an unrecorded piece of TOKUBISHI ART PAPER (hereinafter, referred to as an unused sample in regard to the current evaluation) was placed on the solid image of the sample and was rubbed thereagainst reciprocatingly (back and forth) 10 times with a load of 200 kg/m$^2$. The unused sample and the solid image were visually observed, and rubbing-off resistance was evaluated according to the following evaluation criteria.

—Evaluation Criterion—

1: Transfer of color to unused sample and deterioration of rubbed solid image are not observed.
2: Transfer of color to unused sample is observed, but deterioration of rubbed solid image is not observed.
3: Transfer of color to unused sample and deterioration of rubbed solid image are observed.
4: Transfer of color to unused sample is observed, and rubbed solid image is separated to result in exposure of paper surface.

<Color Reproducibility>

The image for color reproduction evaluation printed on TOKUBISHI ART PAPER was subjected to color measurement using SPECTROSCAN manufactured by GretagMacBeth, and the results were plotted on the chromaticity diagram to measure the distance from the origin of the coordinates on the chromaticity diagram. Specifically, using an a* value (denoted by "a" in Equation 1) and a b* value (denoted by "b" in Equation 1) on the chromaticity diagram, ΔE represented by Equation 1 was calculated. A higher value of ΔE represents better color reproducibility.

$$\Delta E = \sqrt{a^2 + b^2} \quad \text{[Equation 1]}$$

Evaluation Criterion of Blue Color
A: 60≤ΔE
B: 58≤ΔE<60
C: 56≤ΔE<58
D: 53≤ΔE<56
E: ΔE<53

Evaluation Criterion of Red Color
A: 87≤ΔE
B: 85≤ΔE<87
C: 83≤ΔE<85
D: 80≤ΔE<83
E: ΔE<80

Evaluation Criterion of Green Color
A: 80≤ΔE
B: 75≤ΔE<80
C: 73≤ΔE<75
D: 70≤ΔE<73
E: ΔE<70

TABLE 1

| No.[1] | Ink 1 Ink | P (wt %) | D/P | Post-crosslinking acid value [mgKOH/g] | Volume-average particle diameter [nm] | Ink 2 Ink | P (wt %) | D/P | Post-crosslinking acid value [mgKOH/g] | Volume-average particle diameter [nm] | Image forming property | Rubbing-off resistance | Color reproducibility | Remarks |
|---|---|---|---|---|---|---|---|---|---|---|---|---|---|---|
| 101 | M1 | 5.3 | 0.30 | 84 | 90 | C1 | 2.4 | 0.50 | 73 | 95 | 1 | 1 | A | Example |
| 102 | M2 | 5.6 | 0.30 | 84 | 90 | C1 | 2.4 | 0.50 | 73 | 95 | 1 | 1 | A | Example |
| 103 | M3 | 4.5 | 0.50 | 84 | 93 | C1 | 2.4 | 0.50 | 73 | 95 | 1 | 1 | B | Example |
| 104 | M5 | 5.3 | 0.50 | 84 | 94 | C1 | 2.4 | 0.50 | 73 | 95 | 1 | 1 | A | Example |
| 105 | M7 | 5.6 | 0.30 | 56 | 105 | C1 | 2.4 | 0.50 | 73 | 95 | 1 | 1 | A | Example |
| 106 | M8 | 5.6 | 0.30 | 112 | 103 | C1 | 2.4 | 0.50 | 73 | 95 | 2 | 1 | B | Example |
| 107 | M9 | 5.6 | 0.30 | 45 | 99 | C1 | 2.4 | 0.50 | 73 | 95 | 1 | 1 | A | Example |
| 108 | M10 | 5.6 | 0.30 | Not crosslinked | 100 | C1 | 2.4 | 0.50 | 73 | 95 | 3 | 2 | B | Comparative Example |
| 109 | M11 | 5.3 | 0.30 | 84 | 71 | C1 | 2.4 | 0.50 | 73 | 95 | 1 | 1 | A | Example |
| 110 | C2 | 2.7 | 0.50 | 73 | 93 | M2 | 5.6 | 0.30 | 84 | 95 | 1 | 1 | C | Example |
| 111 | C3 | 2.7 | 0.70 | 73 | 98 | M2 | 5.6 | 0.30 | 84 | 95 | 1 | 1 | B | Example |
| 112 | C4 | 2.4 | 0.50 | 73 | 75 | M2 | 5.6 | 0.30 | 84 | 95 | 1 | 1 | C | Example |
| 113 | C5 | 2.4 | 0.30 | 84 | 90 | M2 | 5.6 | 0.30 | 84 | 95 | 1 | 1 | E | Comparative Example |
| 114 | C6 | 2.4 | 0.50 | Not crosslinked | 105 | M2 | 5.6 | 0.30 | 84 | 95 | 3 | 3 | E | Comparative Example |
| 115 | C7 | 1.8 | 0.20 | Not crosslinked | 110 | M12 | 4.0 | 0.20 | Not crosslinked | 95 | 3 | 3 | E | Comparative Example |
| 116 | M12 | 4.0 | 0.20 | Not crosslinked | 120 | C7 | 1.8 | 0.20 | Not crosslinked | 110 | 3 | 3 | C | Comparative Example |

[1]Experimental Example No.

TABLE 2

| No.[1] | Ink 1 Ink | P (wt %) | D/P | Post-crosslinking acid value [mgKOH/g] | Volume-average particle diameter [nm] | Ink 2 Ink | P (wt %) | D/P | Post-crosslinking acid value [mgKOH/g] | Volume-average particle diameter [nm] | Image forming property | Rubbing-off resistance | Color reproducibility | Remarks |
|---|---|---|---|---|---|---|---|---|---|---|---|---|---|---|
| 201 | M1 | 5.3 | 0.30 | 84 | 90 | Y1 | 3.8 | 0.60 | 84 | 120 | 1 | 1 | B | Example |
| 202 | M2 | 5.6 | 0.30 | 84 | 90 | Y1 | 3.8 | 0.60 | 84 | 120 | 1 | 1 | A | Example |
| 203 | M3 | 4.5 | 0.50 | 84 | 93 | Y1 | 3.8 | 0.60 | 84 | 120 | 1 | 1 | C | Example |
| 204 | M4 | 4.0 | 0.30 | 84 | 93 | Y1 | 3.8 | 0.60 | 84 | 120 | 1 | 1 | D | Comparative Example |
| 205 | M5 | 5.3 | 0.50 | 84 | 94 | Y1 | 3.8 | 0.60 | 84 | 120 | 1 | 1 | A | Example |
| 206 | M6 | 4.5 | 0.15 | 84 | 102 | Y1 | 3.8 | 0.60 | 84 | 120 | 2 | 2 | E | Comparative Example |
| 207 | M7 | 5.6 | 0.30 | 56 | 105 | Y1 | 3.8 | 0.60 | 84 | 120 | 1 | 1 | A | Example |
| 208 | M8 | 5.6 | 0.30 | 112 | 103 | Y1 | 3.8 | 0.60 | 84 | 120 | 1 | 1 | B | Example |
| 209 | M9 | 5.6 | 0.30 | 45 | 99 | Y1 | 3.8 | 0.60 | 84 | 120 | 1 | 1 | B | Example |
| 210 | M10 | 5.6 | 0.30 | Not crosslinked | 100 | Y1 | 3.8 | 0.60 | 84 | 120 | 3 | 2 | C | Comparative Example |
| 211 | M11 | 5.6 | 0.30 | 84 | 71 | Y1 | 3.8 | 0.60 | 84 | 120 | 1 | 1 | A | Example |
| 212 | Y1 | 3.8 | 0.60 | 84 | 120 | M2 | 5.6 | 0.30 | 84 | 90 | 1 | 1 | B | Example |
| 213 | Y2 | 3.8 | 0.60 | Not crosslinked | 153 | M2 | 5.6 | 0.30 | 84 | 90 | 3 | 2 | C | Comparative Example |
| 214 | Y3 | 3.8 | 0.30 | 84 | 140 | M2 | 5.6 | 0.30 | 84 | 90 | 1 | 2 | D | Comparative Example |
| 215 | Y4 | 3.8 | 0.30 | Not crosslinked | 130 | M2 | 5.6 | 0.30 | 84 | 90 | 3 | 2 | E | Comparative Example |
| 216 | Y5 | 4.2 | 0.60 | 84 | 110 | M2 | 5.6 | 0.30 | 84 | 90 | 1 | 1 | A | Example |
| 217 | Y6 | 3.8 | 0.30 | Not crosslinked | 150 | M12 | 4.0 | 0.20 | Not crosslinked | 120 | 3 | 3 | E | Comparative Example |
| 218 | M12 | 4.0 | 0.20 | Not crosslinked | 120 | Y6 | 3.8 | 0.30 | Not crosslinked | 150 | 3 | 3 | E | Comparative Example |
| 219 | Y7 | 3.0 | 0.30 | 84 | 115 | M2 | 5.6 | 0.30 | 84 | 90 | 1 | 2 | E | Comparative Example |

[1]Experimental Example No.

TABLE 3

| No.*1 | Ink | Ink 1 P (wt %) | D/P | Post-crosslinking acid value [mgKOH/g] | Volume-average particle diameter [nm] | Ink | Ink 2 P (wt %) | D/P | Post-crosslinking acid value [mgKOH/g] | Volume-average particle diameter [nm] | Image forming property | Rubbing-off resistance | Color reproducibility | Remarks |
|---|---|---|---|---|---|---|---|---|---|---|---|---|---|---|
| 301 | C8 | 2.4 | 0.50 | 73 | 94 | Y1 | 3.8 | 0.60 | 84 | 120 | 1 | 1 | C | Example |
| 302 | C9 | 2.4 | 0.20 | 73 | 92 | Y1 | 3.8 | 0.60 | 84 | 120 | 1 | 1 | D | Comparative Example |
| 303 | C10 | 2.4 | 0.60 | 73 | 96 | Y1 | 3.8 | 0.60 | 84 | 120 | 1 | 1 | C | Example |
| 304 | C11 | 2.4 | 0.70 | 73 | 95 | Y1 | 3.8 | 0.60 | 84 | 120 | 1 | 1 | B | Example |
| 305 | C12 | 2.4 | 0.50 | 112 | 90 | Y1 | 3.8 | 0.60 | 84 | 120 | 2 | 1 | C | Example |
| 306 | C13 | 2.4 | 0.50 | Not crosslinked | 110 | Y1 | 3.8 | 0.60 | 84 | 120 | 3 | 2 | D | Comparative Example |
| 307 | C14 | 2.4 | 0.50 | 45 | 100 | Y1 | 3.8 | 0.60 | 84 | 120 | 1 | 1 | C | Example |
| 308 | C15 | 1.6 | 0.50 | 73 | 94 | Y1 | 3.8 | 0.60 | 84 | 120 | 1 | 1 | E | Comparative Example |
| 309 | C16 | 2.7 | 0.50 | 73 | 94 | Y1 | 3.8 | 0.60 | 84 | 120 | 1 | 1 | B | Example |
| 310 | C17 | 2.7 | 0.50 | 73 | 77 | Y1 | 3.8 | 0.60 | 84 | 120 | 1 | 1 | A | Example |
| 311 | Y1 | 3.8 | 0.60 | 73 | 120 | C1 | 2.7 | 0.50 | 73 | 95 | 1 | 1 | A | Example |
| 312 | Y2 | 3.8 | 0.60 | Not crosslinked | 153 | C1 | 2.7 | 0.50 | 73 | 95 | 3 | 2 | B | Comparative Example |
| 313 | Y8 | 2.5 | 0.30 | 84 | 115 | C1 | 2.7 | 0.50 | 73 | 95 | 1 | 1 | D | Comparative Example |
| 314 | Y5 | 4.2 | 0.60 | 73 | 110 | C1 | 2.7 | 0.50 | 73 | 95 | 1 | 1 | A | Example |
| 315 | Y9 | 2.5 | 0.30 | Not crosslinked | 150 | C13 | 2.4 | 0.50 | Not crosslinked | 110 | 3 | 3 | E | Comparative Example |
| 316 | C7 | 1.8 | 0.20 | Not crosslinked | 110 | Y6 | 3.8 | 0.30 | Not crosslinked | 150 | 3 | 3 | E | Comparative Example |

*1Experimental Example No.

As shown in Table 1 to Table 3, an image forming property and rubbing-off resistance of an image were excellent, and color reproducibility of a secondary color was superior in the Examples using, as a first ink composition, a magenta ink composition in which the content of the magenta pigment based on the total amount of the magenta ink composition was in a range of from 4.2 to 6.0% by mass, and the mass ratio of the crosslinked water-soluble resin to the magenta pigment [mass of crosslinked water-soluble resin/mass of magenta pigment] was in a range of 0.25 or more.

Further, an image forming property and rubbing-off resistance of an image were excellent, and color reproducibility of a secondary color was superior in the Experimental Examples using, as a first ink composition, a cyan ink composition in which the content of the cyan pigment based on the total amount of the cyan ink composition was in a range of from 2.0 to 4.0% by mass, and the mass ratio of the crosslinked water-soluble resin to the cyan pigment [mass of crosslinked water-soluble resin/mass of cyan pigment] was in a range of 0.40 or more.

Further, an image forming property and rubbing-off resistance of an image were excellent, and color reproducibility of a secondary color was superior in the Experimental Examples using, as a first ink composition, a yellow ink composition in which the content of the yellow pigment based on the total amount of the yellow ink composition was in a range of from 3.0 to 6.0% by mass, and the mass ratio of the crosslinked water-soluble resin to the yellow pigment [mass of crosslinked water-soluble resin/mass of yellow pigment] was in a range of 0.40 or more.

Exemplary embodiments of the invention include, but are not limited to, the following.

<1> An ink set comprising: a yellow ink composition containing a resin-coated yellow pigment in which a yellow pigment is coated with a crosslinked water-soluble resin, a water-soluble polymerizable compound and water; a magenta ink composition containing a resin-coated magenta pigment in which a magenta pigment is coated with a crosslinked water-soluble resin, a water-soluble polymerizable compound and water; a cyan ink composition containing a resin-coated cyan pigment in which a cyan pigment is coated with a crosslinked water-soluble resin, a water-soluble polymerizable compound and water; and a treatment liquid containing an aggregating agent for aggregating components in the ink compositions, wherein, when a red, green or blue image is formed by superposing any two ink compositions selected from the group consisting of the yellow ink composition, the magenta ink composition and the cyan ink composition, the yellow ink composition, the magenta ink composition or the cyan ink composition jetted first among the two ink compositions satisfies one of the following requirements (1) to (3):

(1) when the ink composition jetted first among the two ink compositions is the magenta ink composition, the magenta ink composition has a content of the magenta pigment of from 4.2 to 6.0% by mass based on the total amount of the magenta ink composition, and a mass ratio of the crosslinked water-soluble resin to the magenta pigment (mass of crosslinked water-soluble resin/mass of magenta pigment) is 0.25 or more;

(2) when the ink composition jetted first among the two ink compositions is the cyan ink composition, the cyan ink composition has a content of the cyan pigment of from 2.0 to 4.0% by mass based on the total amount of the cyan ink composition, and a mass ratio of the crosslinked water-soluble resin to the cyan pigment (mass of crosslinked water-soluble resin/mass of cyan pigment) is 0.40 or more; or (3) when the ink composition jetted first among the two ink compositions is the yellow ink composition, the yellow ink composition has a content of the yellow pigment of from 3.0 to 6.0% by mass based on the total amount of the yellow ink composition, and a mass ratio of the crosslinked water-soluble resin to the yellow pigment (mass of crosslinked water-soluble resin/mass of yellow pigment) is 0.40 or more.

<2> The ink set of <1>, wherein at least one resin-coated pigment selected from the group consisting of the resin-coated yellow pigment, the resin-coated magenta pigment and the resin-coated cyan pigment has a volume average particle diameter of from 50 nm to 150 nm.

<3> The ink set of <1> or <2>, wherein at least one ink composition selected from the group consisting of the yellow ink composition, the magenta ink composition and the cyan ink composition further includes a photopolymerization initiator.

<4> The ink set of any one of <1> to <3>, wherein in at least one ink composition selected from the group consisting of the yellow ink composition, the magenta ink composition and the cyan ink composition, the water-soluble resin includes a carboxy group.

<5> The ink set of any one of <1> to <4>, wherein in at least one resin-coated pigment selected from the group consisting of the resin-coated cyan pigment, the resin-coated magenta pigment and the resin-coated yellow pigment, the water-soluble resin includes at least a constituent unit derived from benzyl(meth)acrylate and a constituent unit derived from (meth)acrylic acid, and the water-soluble resin has a post-crosslinking acid value of from 55 mgKOH/g to 100 mgKOH/g.

<6> The ink set of any one of <1> to <5>, wherein at least one resin-coated pigment selected from the group consisting of the resin-coated cyan pigment and the resin coated magenta pigment has a volume average particle diameter of from 50 nm to 100 nm.

<7> The ink set of any one of <1> to <6>, wherein the aggregating agent in the treatment liquid is an acidic compound.

<8> The ink set of any one of <1> to <7>, wherein in at least one ink composition selected from the group consisting of the yellow ink composition, the magenta ink composition and the cyan ink composition, the water-soluble polymerizable compound includes two or more polymerizable functional groups selected from the group consisting of an acrylamide group, a methacrylamide group, a maleimide group, a vinylsulfone group and an N-vinylamide group, and has a ratio of a molecular weight to a number of the polymerizable functional groups contained in a molecule thereof of 175 or less.

<9> An image forming method using the ink set of any one of <1> to <8>, the method comprising:
applying the treatment liquid containing the aggregating agent for aggregating components in the ink compositions onto a recording medium,
applying a first ink composition selected from the ink set onto the recording medium onto which the treatment liquid has been applied, by an inkjet method,
applying a second ink composition selected from the ink set onto the first ink composition that has been applied onto the recording medium, by an inkjet method, and
curing the ink compositions by irradiating active energy radiation on the recording medium onto which the ink compositions have been applied.

<10> The image forming method of <9>, wherein the active energy radiation is ultraviolet rays.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set comprising: a yellow ink composition containing a resin-coated yellow pigment in which a yellow pigment is coated with a crosslinked water-soluble resin, a water-soluble polymerizable compound and water; a magenta ink composition containing a resin-coated magenta pigment in which a magenta pigment is coated with a crosslinked water-soluble resin, a water-soluble polymerizable compound and water; a cyan ink composition containing a resin-coated cyan pigment in which a cyan pigment is coated with a crosslinked water-soluble resin, a water-soluble polymerizable compound and water; and a treatment liquid containing an aggregating agent for aggregating components in the ink compositions, wherein the yellow pigment is C.I. Pigment Yellow 74, the magenta pigment is at least one selected from the group consisting of C.I. Pigment Red 122, C.I. Pigment Red 202, C.I. Pigment Red 209 and C.I. Pigment Violet 19, and the cyan pigment is at least one selected from the group consisting of C.I. Pigment Blue 15:3 and C.I. Pigment Blue 15:4, wherein the resin-coated yellow pigment has a volume average particle diameter of from 50 nm to 150 nm, the resin-coated magenta pigment has a volume average particle diameter of from 50 nm to 150 nm, and the resin-coated cyan pigment has a volume average particle diameter of from 50 nm to 150 nm, wherein a content of resin particles in the yellow ink composition is 3% by mass or less based on the total amount of the yellow ink composition, a content of resin particles in the magenta ink composition is 3% by mass or less based on the total amount of the magenta ink composition, and a content of resin particles in the cyan ink composition is 3% by mass or less based on the total amount of the cyan ink composition, and wherein, when a red, green or blue image is formed by superposing any two ink compositions selected from the group consisting of the yellow ink composition, the magenta ink composition and the cyan ink composition, the yellow ink composition, the magenta ink composition or the cyan ink composition jetted first among the two ink compositions satisfies one of the following requirements (1) to (3):

(1) when the ink composition jetted first among the two ink compositions is the magenta ink composition, the magenta ink composition has a content of the magenta pigment of from 4.2 to 6.0% by mass based on the total amount of the magenta ink composition, and a mass ratio of the crosslinked water-soluble resin to the magenta pigment (mass of crosslinked water-soluble resin/mass of magenta pigment) is 0.25 or more;

(2) when the ink composition jetted first among the two ink compositions is the cyan ink composition, the cyan ink composition has a content of the cyan pigment of from 2.0 to 4.0% by mass based on the total amount of the cyan ink composition, and a mass ratio of the crosslinked water-soluble resin to the cyan pigment (mass of crosslinked water-soluble resin/mass of cyan pigment) is 0.40 or more; or (3) when the ink composition jetted first among the two ink compositions is the yellow ink composition, the yellow ink composition has a content of the yellow pigment of from 3.0 to 6.0% by mass based on the total amount of the yellow ink composition, and a mass ratio of the crosslinked water-soluble resin to the yellow pigment (mass of crosslinked water-soluble resin/mass of yellow pigment) is 0.40 or more.

2. The ink set of claim 1, wherein at least one ink composition selected from the group consisting of the yellow ink composition, the magenta ink composition and the cyan ink composition further includes a photopolymerization initiator.

3. The ink set of claim 1, wherein in at least one ink composition selected from the group consisting of the yellow ink composition, the magenta ink composition and the cyan ink composition, the water-soluble resin includes a carboxy group.

4. The ink set of claim 1, wherein in at least one resin-coated pigment selected from the group consisting of the resin-coated cyan pigment, the resin-coated magenta pigment and the resin-coated yellow pigment, the water-soluble resin includes at least a constituent unit derived from benzyl(meth)acrylate and a constituent unit derived from (meth)acrylic acid, and the water-soluble resin has a post-crosslinking acid value of from 55 mgKOH/g to 100 mgKOH/g.

5. The ink set of claim 1, wherein at least one resin-coated pigment selected from the group consisting of the resin-coated cyan pigment and the resin coated magenta pigment has a volume average particle diameter of from 50 nm to 100 nm.

6. The ink set of claim 1, wherein the aggregating agent in the treatment liquid is an acidic compound.

7. An image forming method using the ink set of claim 1, the method comprising:
    applying the treatment liquid containing the aggregating agent for aggregating components in the ink compositions onto a recording medium,
    applying a first ink composition selected from the ink set onto the recording medium onto which the treatment liquid has been applied, by an inkjet method,
    applying a second ink composition selected from the ink set onto the first ink composition that has been applied onto the recording medium, by an inkjet method, and
    curing the ink compositions by irradiating active energy radiation on the recording medium onto which the ink compositions have been applied.

8. The image forming method of claim 7, wherein the active energy radiation is ultraviolet rays.

9. The ink set of claim 1, wherein the resin-coated yellow pigment has a volume average particle diameter of from 50 nm to 130 nm, the resin-coated magenta pigment has a volume average particle diameter of from 50 nm to 120 nm, and the resin-coated cyan pigment has a volume average particle diameter of from 50 nm to 120 nm.

10. The ink set of claim 1, wherein the content of resin particles in the yellow ink composition is 1% by mass or less based on the total amount of the yellow ink composition, the content of resin particles in the magenta ink composition is 1% by mass or less based on the total amount of the magenta ink composition, and the content of resin particles in the cyan ink composition is 1% by mass or less based on the total amount of the cyan ink composition.

11. The ink set of claim 1, wherein in at least one selected from the group consisting of the yellow ink composition, the magenta ink composition and the cyan ink composition, the polymerizable compound comprises a compound represented by the following formula (M-2):

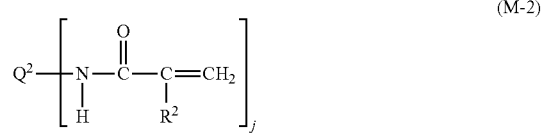

(M-2)

wherein in formula (M-2), $Q^2$ represents a j-valent linking group, $R^2$ represents a hydrogen atom or a methyl group, and j represents an integer of 2 or greater.

12. The ink set of claim 11, wherein J is an integer from 2 to 6.

* * * * *